(12) United States Patent
Fujimoto et al.

(10) Patent No.: US 7,896,216 B2
(45) Date of Patent: Mar. 1, 2011

(54) STICKING PAD, FRICTION STIR WELDING MACHINE AND FRICTION STIR WELDING SYSTEM

(75) Inventors: Mitsuo Fujimoto, Kobe (JP); Hidehito Nishida, Kobe (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 0 days.

(21) Appl. No.: 12/448,246

(22) PCT Filed: Feb. 6, 2008

(86) PCT No.: PCT/JP2008/051919
§ 371 (c)(1),
(2), (4) Date: Nov. 4, 2009

(87) PCT Pub. No.: WO2008/126459
PCT Pub. Date: Oct. 23, 2008

(65) Prior Publication Data
US 2010/0213242 A1 Aug. 26, 2010

(30) Foreign Application Priority Data
Mar. 30, 2007 (JP) .............................. 2007-093541

(51) Int. Cl.
*B23K 20/12* (2006.01)
*B23K 37/04* (2006.01)
(52) U.S. Cl. .................................. 228/2.1; 228/112.1
(58) Field of Classification Search .................. None
See application file for complete search history.

(56) References Cited
U.S. PATENT DOCUMENTS 6,237,835 B1 * 5/2001 Litwinski et al. ......... 228/112.1
6,758,382 B1 * 7/2004 Carter ......................... 228/2.1
7,322,508 B2 * 1/2008 Chang et al. ................. 228/2.1
2003/0209586 A1 * 11/2003 Thompson .................. 228/103
2005/0001016 A1 * 1/2005 Chang et al. ............. 228/112.1

(Continued)

FOREIGN PATENT DOCUMENTS

DE 102006055286 A1 * 5/2008

(Continued)

OTHER PUBLICATIONS

Oct. 13, 2009 International Preliminary Report on Patentability issued in International Patent Application No. PCT/JP2008/051919.

*Primary Examiner*—Kiley Stoner
(74) *Attorney, Agent, or Firm*—Oliff & Berridge, PLC

(57) ABSTRACT

A lightweight, mobile friction stir welding machine, a sticking pad for the friction stir welding machine, and a friction stir welding system are provided. The sticking pad has a flat base member facing an object, an annular sealing member protruding from one of major surfaces of the base member so as to surround a central area of the surface of the base member, a slippery member attached to the end surface of the annular sealing member facing the object, and one or some deformation-suppressing protrusions protruding from the surface facing the object of the base member. The slippery member is made of a material that can make the slippery member contact the object with a friction coefficient lower than that with which the sealing member can be in contact with the same object.

18 Claims, 12 Drawing Sheets

U.S. PATENT DOCUMENTS

| | | | |
|---|---|---|---|
| 2005/0092817 A1* | 5/2005 | Baumann et al. | 228/212 |
| 2006/0059671 A1* | 3/2006 | Okafuji et al. | 29/56.5 |
| 2006/0065698 A1* | 3/2006 | Ishikawa et al. | 228/112.1 |
| 2006/0102689 A1* | 5/2006 | Trapp et al. | 228/2.1 |
| 2006/0191979 A1* | 8/2006 | Lohwasser | 228/112.1 |
| 2006/0289604 A1* | 12/2006 | Zettler et al. | 228/2.1 |
| 2007/0000972 A1* | 1/2007 | Koga et al. | 228/112.1 |
| 2007/0090159 A1* | 4/2007 | Nagano | 228/101 |
| 2007/0266536 A1* | 11/2007 | Burton et al. | 29/428 |
| 2008/0112768 A1* | 5/2008 | Matlack et al. | 408/1 BD |

FOREIGN PATENT DOCUMENTS

| | | |
|---|---|---|
| GB | 2320218 A1 | 6/1998 |
| JP | A-10-166165 | 6/1998 |
| JP | 10-249586 A * | 9/1998 |
| JP | A-11-285829 | 10/1999 |
| JP | A-2001-025886 | 1/2001 |
| JP | A-2002-254192 | 9/2002 |
| JP | 2004-4160475 A * | 6/2004 |
| JP | A-2005-186084 | 7/2005 |
| JP | A-2007-000876 | 1/2007 |

* cited by examiner

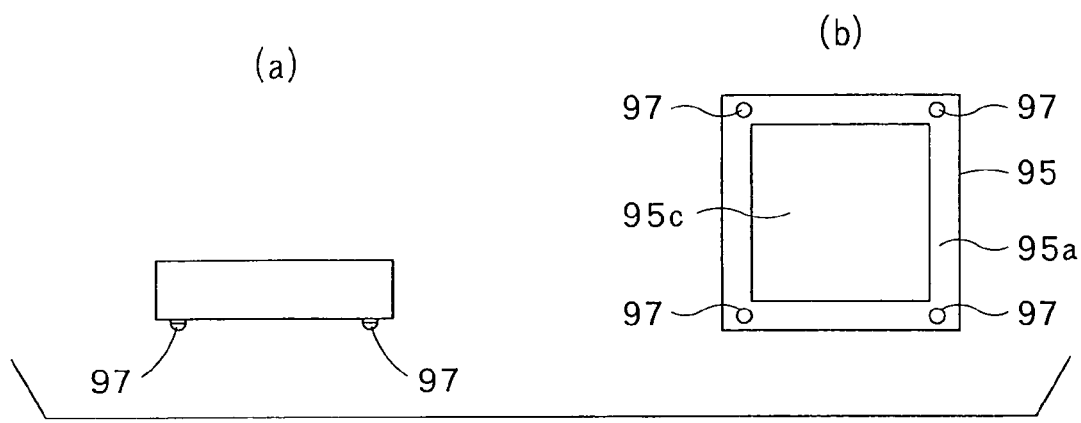
F I G. 1 4
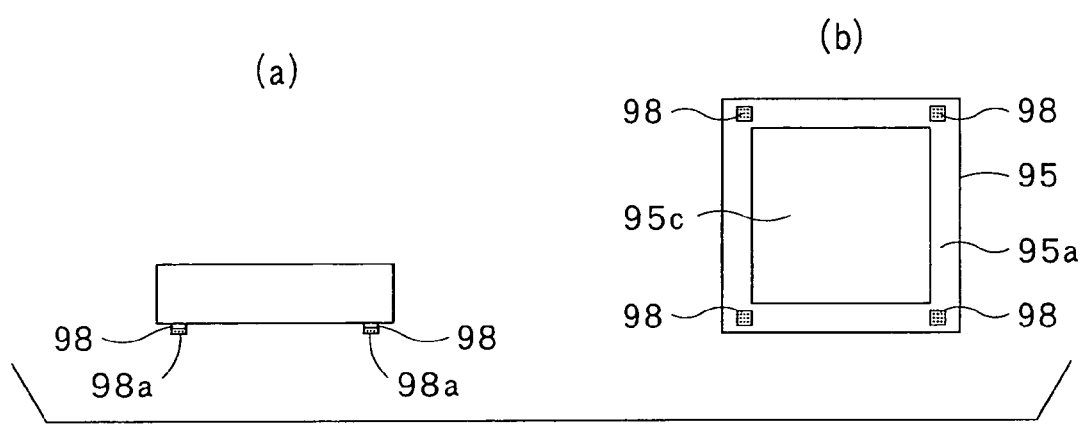
F I G. 1 5
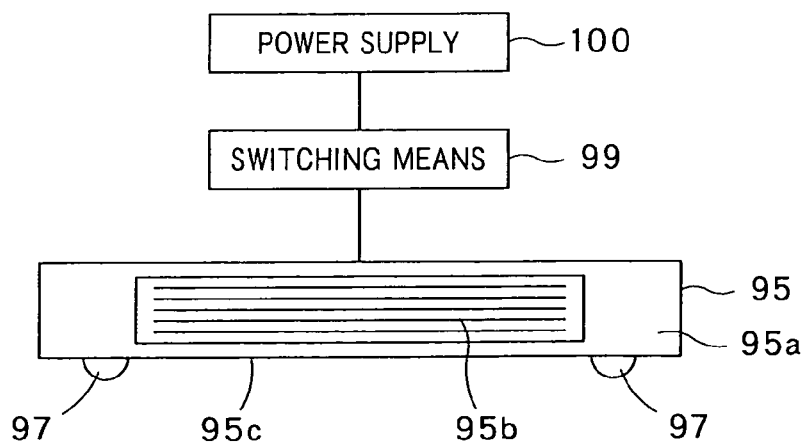
F I G. 1 6

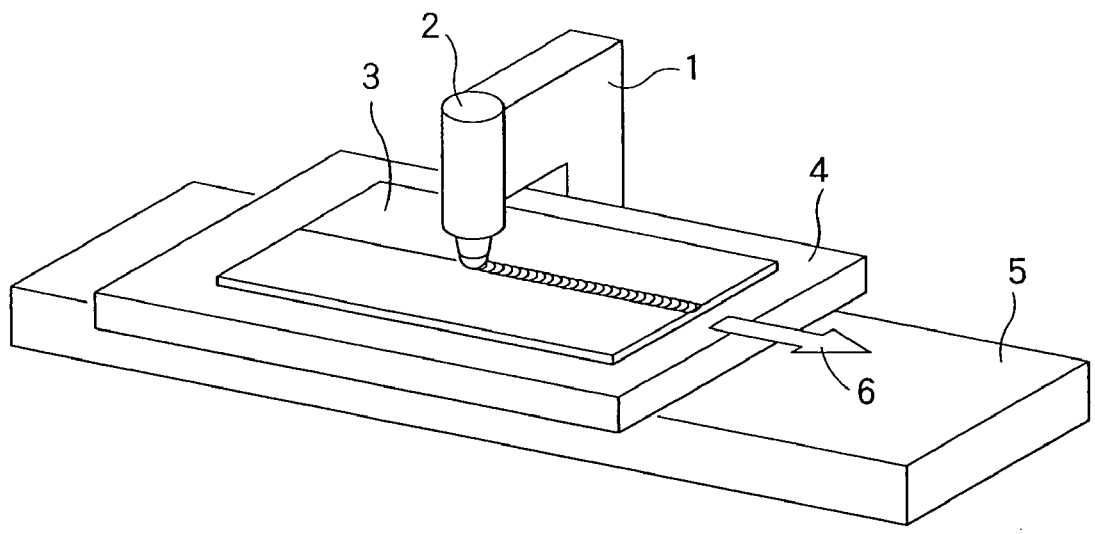
F I G. 1 7
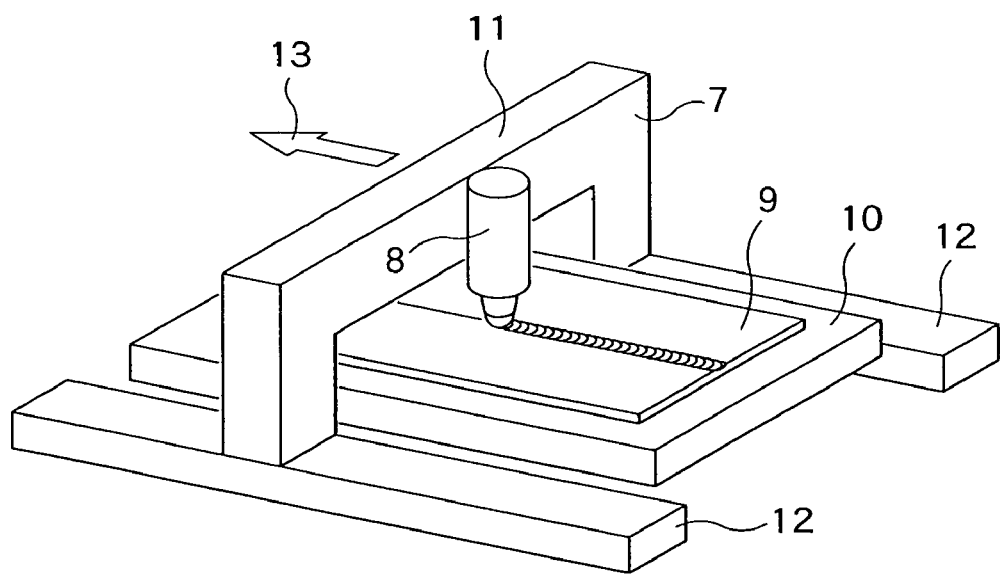
F I G. 1 8

STICKING PAD, FRICTION STIR WELDING MACHINE AND FRICTION STIR WELDING SYSTEM

TECHNICAL FIELD

The present invention relates to a friction stir welding machine for welding together plural workpieces by friction stirring, a sticking pad employed in the friction stir welding machine, and a friction stir welding system.

BACKGROUND ART

A known friction stir welding machine provided with a welding tool is used for carrying out a method of welding plural workpieces together.

FIG. 17 is a typical perspective view of a moving table type friction stir welding machine 1. The friction stir welding machine 1 includes a welding tool 2, a work table for supporting workpieces 3 thereon, and a base 5 on which the work table 4 is moved unidirectionally. The work table 4 supporting the workpieces 3 thereon is moved in a moving direction indicated by the arrow 6. The welding tool 2 can be moved toward and away from the work table 4. The rotating welding tool 2 is pressed against the workpieces 3 and the joint of the workpieces 3 extending along a weld line is welded by friction stir welding as the workpieces 3 are moved in the moving direction.

FIG. 18 is a typical perspective view of a gantry type friction stir welding machine 7. The friction stir welding machine 7 includes a welding tool 8, a work table 10 for supporting workpieces 9, a support structure 11 supporting the welding tool 8, and guide rails 12 for guiding the support structure for movement in a welding direction. The gantry type friction stir welding machine 7 differs from the moving table type friction stir welding machine 1 in that the work table 10 supporting the workpieces 3 is stationary, and the support structure 11 supporting the welding tool 8 moves in a moving direction indicated by the arrow 13 in FIG. 18. The welding tool 8 can be moved toward and away from the work table 10. The rotating welding tool 2 is pressed against the workpieces 9 and the joint of the workpieces 3 extending along a weld line is welded by friction stir welding as the welding tool 8 is moved in the moving direction.

The moving table type friction stir welding machine 1 needs to move the workpieces 3 by a distance corresponding to the length of the joint. The workpieces 3 need to be moved by a distance at least twice the length of the joint. When the workpieces 3 have a length of, for example, 20 m, the length of the base 5 of the moving table type friction stir welding machine 1 needs to be 40 m or above. The moving table type friction stir welding machine 1 having the base 5 of such a long length is large and requires a large space for installation. Similarly, the welding tool 8 of the gantry type friction stir welding machine 7 needs to be moved by a distance corresponding to the length of the joint and needs the guide rails 12 having at least a length equal to the length of the joint. Thus, the gantry type friction stir welding machine 7 is large and requires a large space for installation.

FIG. 19 is a typical perspective view of a known self-propelled friction stir welding machine 15 formed in a small size by a conventional technique. The self-propelled friction stir welding machine 15 includes a welding tool 16 and a vehicle 17 capable of carrying the welding tool 16. The vehicle 17 has four wheels 18. The wheels 18 are rotated to propel the self-propelled friction stir welding machine 15 for traveling in a traveling direction indicated by the arrow 21 shown in FIG. 19 on the surfaces of workpieces 20 placed on a work table 19. The self-propelled friction stir welding machine 15 presses the rotating welding tool 16 against the workpieces 20 while traveling in the traveling direction to weld the joint of the workpieces 20 by friction stir welding. The size of the self-propelled friction stir welding machine 15, unlike those of the foregoing moving table type and the gantry type friction stir welding machine, is not dependent on the size of the workpieces 3 and the self-propelled friction stir welding machine 15 can be formed in a small size as mentioned in, for example, Patent documents 1 and 2.

Patent document 1: JP 2005-186084 A
Patent document 2: JP 2007-876 A

DISCLOSURE OF THE INVENTION

Problem to be Solved by the Invention

FIG. 20 is a view of assistance in explaining reaction forces that act on the welding tool 16 during friction stir welding. The welding tool 16 is tilted on its tip in contact with the workpieces 20 such that its reference axis L is inclined at an angle θ to a vertical direction Z perpendicular to the surfaces of the workpieces 20 in a direction opposite the traveling direction. The welding tool 16 is rotated clockwise, as viewed from the side opposite the side of the tip of the welding tool 16, about the reference axis L, is pressed against the workpieces 20 and is moved in the traveling direction indicated by the arrow 21. Then, a reaction force F1 acting in a direction parallel to the reference axis L and pushing the welding tool 16 away from the workpieces (hereinafter, referred to as "axial reaction force F1"), a reaction force F2 acting in a direction opposite the traveling direction (hereinafter, referred to as "travel reaction force F2"), and a reaction force F3 resulting from the rotation of the welding tool 16 and acting in a direction perpendicular to the reference axis L and the traveling direction and to the left with respect to the traveling direction (hereinafter, referred to as "lateral reaction force F3") act on the welding tool 16. In FIG. 20, the rotating direction of the welding tool 16 is indicated by r to facilitate understanding.

The welding tool 16 is tilted on its tip in contact with the workpieces 20 such that its reference axis L is inclined at an angle θ to the vertical direction Z in a direction opposite the traveling direction for the following reasons. Whereas a front part of the joint on the front side of a part of the joint in contact with the tip of the welding tool 16 with respect to the traveling direction is hard, a rear part of the joint on the rear side of the part of the joint in contact with the tip of the welding tool 16 with respect to the traveling direction is fluidized by frictional stirring and soft.

The lateral reaction force F3 acts to the left with respect to the traveling direction on the welding tool 16 because the front part of the joint is hard and the welding tool rotates clockwise.

When friction stir welding is carried out at a high welding speed, the foregoing reaction forces are high. Consequently, the self-propelled friction stir welding machine cannot travel just as it is intended because the axial reaction force F1 separates the wheels 18 from the workpieces 20 and the lateral reaction force F3 causes the wheels 18 to meander. Such problems may be solved by loading the self-propelled friction stir welding machine 15 with a weight or providing the self-propelled friction stir welding machine 15 with sticking pads for holding the self-propelled friction stir welding machine 15 on the workpieces 20 by suction to cancel out those reaction forces. However, the weight increases the weight of the self-propelled friction stir welding machine to deteriorate the operability of the self-propelled friction stir welding machine. Attraction of the self-propelled friction stir welding machine to the workpieces 20 by the sticking pads increases the travel reaction force F2 to impede the travel of the self-propelled friction stir welding machine.

Accordingly, it is an object of the present invention to provide a lightweight friction stir welding machine capable of being moved by a low force, a sticking pad intended for use on the friction stir welding machine, and a friction stir welding system.

Means for Solving the Problem

The present invention provides a sticking pad incorporated into a friction stir welding machine including a vehicle and capable of welding plural workpieces together by friction stir welding with a welding tool while traveling along the workpieces, and capable of being brought into contact with an object to keep the welding tool in contact with the workpieces by attraction and of being selectively set in either of an operative state in which the sticking pad is in contact with the object to make attraction effective and an inoperative state in which the sticking pad is separated from the object to make attraction ineffective.

The sticking pad includes: an elastic, annular sealing member capable of sealing a suction space; and a slippery member attached to a surface of the sealing member facing the object, and made of a material that makes the slippery member contact the object with a friction coefficient lower than that with which the sealing member can be in contact with the object.

The sticking pad further includes protrusions extending toward the object in the suction space, having a rigidity higher than that of the sealing member, and made of a material that can make the protrusions contact the object with a friction coefficient lower than that with which the sealing member is in contact with the object.

A friction stir welding machine according to the present invention capable welding plural workpieces together by friction stir welding using a welding tool includes: the foregoing sticking pads; a tool holding device rotatable about a reference axis and holding the welding tool; a rotational driving means for driving the tool holding device for rotation about the reference axis; a linear shifting means for driving the tool holding device for movement along the reference axis; and a vehicle loaded with the tool holding device, the rotational driving means, and the linear shifting means and capable of traveling.

The friction stir welding machine is provided with plural sticking pads including main sticking pads capable of producing a high attraction and disposed on a front part of the vehicle, and at least one auxiliary sticking pad disposed on the rear side of the main sticking pads and capable of producing a low attraction, and the number and positions of at least one auxiliary sticking pad are adjustable.

The friction stir welding machine further includes a switching means for selectively setting the sticking pads in either of an operative state and an inoperative state.

A friction stir welding system according to the present invention includes the friction stir welding machine; and guide rails extended along a weld line and having a high rigidity higher than that of workpieces; wherein the sticking pads are attracted to the guide rails.

The guide rails have surfaces on which wheels included in the friction stir welding machine roll and to which the sticking pads stick, and the surfaces of the guide rails are finished by a predetermined process such that the sticking pads are in contact with the surfaces of the guide rails with a low friction coefficient.

A friction stir welding machine according to the present invention includes: guide rails extended on the surfaces of workpieces along a weld line corresponding to the joint of the workpieces and having parallel parts extending parallel to the surfaces of the workpieces; and a friction stir welding machine having guide members, capable of welding the workpieces together by friction stir welding with a welding tool while a vehicle is traveling with the guide members kept in contact with surfaces of the parallel parts of the guide rails facing the workpieces.

Each of the guide rails has a vertical part having a guide surface perpendicular to the surfaces of the workpieces, and the friction stir welding machine further includes second guide members in contact with the guide surfaces.

The sticking pad can electromagnetically stick to the object, and the sticking pad is provided with an electromagnet capable of attracting the object when a current is supplied thereto.

The sticking pad is provided with plural protrusions for spacing the electromagnet from the object.

Each of the protrusions has a spherical tip.

A slippery film is formed on the tip of each protrusion to make the protrusion slide easily relative to the object.

A friction stir welding system according to the present invention includes: the friction stir welding machine; and guide rails extended along a weld line corresponding to the joint of workpieces and having a rigidity higher than those of the workpieces; wherein the object to which the sticking pads can be attracted is the guide rails.

According to the present invention, each of the sticking pads includes a sealing member and a slippery member. The slippery member can be in contact with the object with a friction coefficient lower than that with which the sealing member is in contact with the object. The sticking pad, as compared with an ordinary sticking pad not provided with the slippery member, can easily slide on the surface of the object and hence the travel reaction force is low. The friction stir welding machine provided with the sticking pads of the present invention can be driven for traveling by a low force even if friction stir welding is carried out at a high welding speed because a travel reaction force that acts on the sticking pads is lower than that acting on an ordinary sticking pads not provided with the slippery member. Thus, friction stir welding can be carried out at a high welding speed. The separation of the wheels of the friction stir welding machine provided with the sticking pads from the workpieces by the axial reaction force can be prevented without providing the friction stir welding machine with a weight. Thus, the friction stir welding machine can be formed in a lightweight structure.

According to the present invention, each of the sticking pads is provided with the protrusions extending toward the object in the suction space. Since the rigidity of the protrusions is higher than that of the sealing member, the protrusions come into contact with the object and can prevent the object from warping even if the object is thin and has a low rigidity. If the object warps, it is possible that workpieces are deformed by friction stir welding, and that a gap is formed between each sticking pad and the workpiece to increase the pressure in the suction space causing attraction to decrease. When the workpieces are prevented from warping, such troubles attributable to warped workpieces can be avoided. Since the surfaces of the protrusions are made of a material capable of being in contact with the object with a friction coefficient lower than that with which the sealing member is in contact with the object, increase in the travel reaction force acting on the friction stir welding machine can be suppressed to the least possible extent even if the protrusions are in contact with the object.

According to the present invention, the welding tool holding device is rotated and pressed toward the workpieces by the rotational driving means and the linear shifting means to press the rotating welding tool against the workpieces. The workpieces can be welded together by moving the vehicle with the rotating welding tool pressed against the workpieces. The friction stir welding machine provided with the sticking pads can be driven for intended travel by a low driving force and can be formed in a lightweight structure.

According to the present invention, the plural sticking pads can be selectively set in either of the operative state and the inoperative state by the switching means. The sticking force can be thus adjusted.

According to the present invention, the sticking pads are attracted to the guide rails, the guide rails are extended along a weld line corresponding to the joint of the workpieces have a rigidity higher than that of parts of the workpieces to be attracted and are resistant to deformation that may be caused when the sticking pads attract the guide rails. Deformation of the workpieces can be prevented by the attraction of the sticking pads to the guide rails.

According to the present invention, the surfaces of the guide rails with which the wheels and the sticking pads come into contact are finished by a predetermined process such that the sticking pads are in contact with the surfaces of the guide arils with a low friction coefficient. Therefore, travel reaction force that acts on the sticking pads when the friction stir welding machine travels can be reduced. Since the friction stir welding machine travels without the wheels coming into contact with the workpieces, it is possible to prevent the workpieces from being damaged by friction stir welding.

According to the present invention, the guide rails are extended along a weld line corresponding to the joint of the workpieces. The guide rails have the parts extending parallel to the surfaces of the workpieces. The friction stir welding machine travels with the guide members kept in contact with the surfaces of the parts of the guide rails parallel to the surfaces of the workpieces and facing the workpieces. Thus, the reaction force that acts on the welding tool when the welding tool is pressed against the workpieces can be cancelled out even if friction stir welding is carried out at a high welding speed. Thus, the wheels of the friction stir welding machine can be prevented from being separated from the guide rails. Consequently, the friction stir welding machine can achieve intended travel and can weld the workpieces along the intended weld line by friction stir welding using the welding tool.

According to the present invention, the guide rails have the vertical parts having the guide surfaces perpendicular to the surfaces of the workpieces. The friction stir welding machine travels with the second guide members in contact with the guide surfaces. Thus, the lateral reaction force that acts on the rotating welding tool can be cancelled out. Consequently, the friction stir welding machine can be prevented from meandering and can achieve intended travel even if friction stir welding is carried out at a high welding speed, and the desired parts of the workpieces can be welded together at a high welding speed by friction stir welding using the welding tool.

The sticking pads can be electromagnetically attracted to the object. The electromagnetic force attracts the sticking pads to the object. Therefore, the attraction acting on the moving sticking pads can be stabilized at a fixed level by the electromagnetic force more effectively than by mechanical friction force.

Since the sticking pads are electrically controlled by the switching means, the condition of the sticking pads can be quickly changed between an operative state and an inoperative state.

Since the electromagnets of the sticking pads are kept separated from the object, running resistance is low as compared with a state where the sticking pads are brought mechanically into contact with the object. Thus, the friction stir welding can be achieved at a high welding speed.

Since the attraction is dependent on electromagnetic force, work for changing expendable members necessary for vacuum suction, such as rubber members and sponge members, is not necessary.

BRIEF DESCRIPTION OF THE DRAWINGS

FIGS. 14($a$) and 14($b$) are a side elevation and a bottom view, respectively, of an electromagnetic sticking pad;

FIGS. 15($a$) and 15($b$) are a side elevation and a bottom view, respectively, of another electromagnetic sticking pad;

FIG. 16 is a view of assistance in explaining the internal construction of an electromagnetic sticking pad, and a switching device;

FIG. 17 is a typical perspective view of a moving table type friction stir welding machine 1;

FIG. 18 is a typical perspective view of a gantry type friction stir welding machine 7;

BEST MODE FOR CARRYING OUT THE INVENTION

Figure 1:
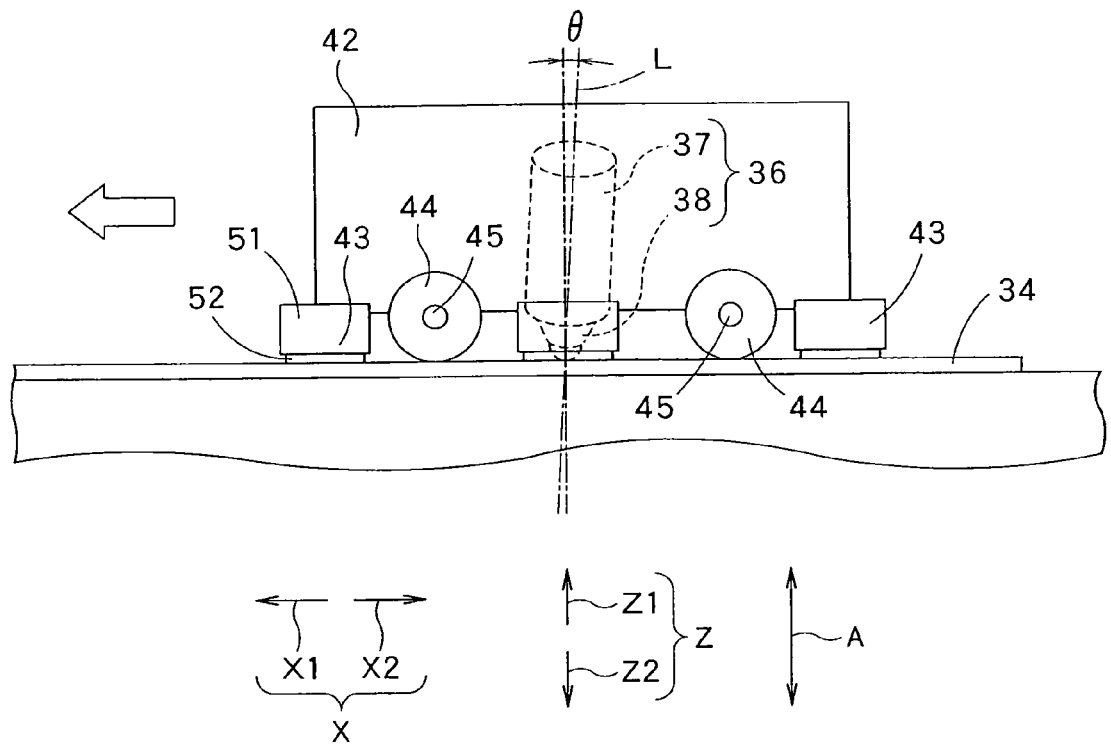
FIG. 1 is a typical side elevation of a welding machine 31 in a first embodiment according to the present invention.
Figure 2:
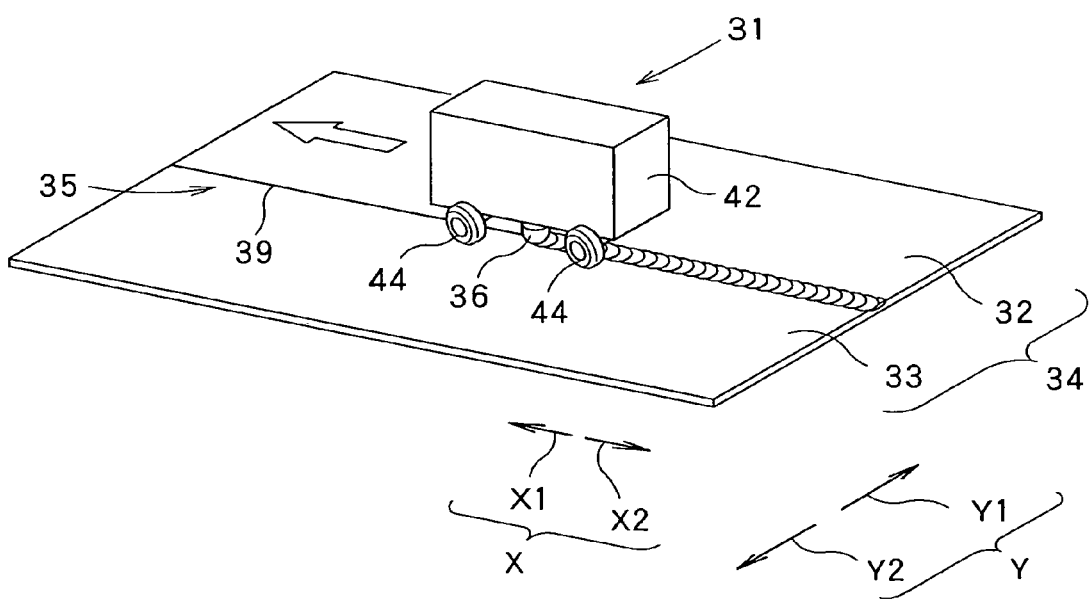
FIG. 2 is a perspective view of the welding machine 31 in operation.

FIG. 1 is a typical side elevation of a friction stir welding machine 31 (hereinafter, referred to simply as "welding machine 31") in a first embodiment according to the present invention. FIG. 2 is a perspective view of the welding machine 31 in operation.

The welding machine 31 welds a workpiece 34 formed by placing two workpieces 32 and 33 edge to edge. A joint 35 is formed between the workpieces 32 and 33 joined edge to edge. A welding tool 36 included in the welding machine 31 is moved continuously along the joint 35 to weld the workpieces 32 and 33 together. A joint line 39, namely, a boundary line between the workpieces 32 and 33, is formed in the surface of the joint 35. In this embodiment, the joint line 39 is straight.

The welding machine 31 provided with the cylindrical welding tool 36 carries out friction stir welding with the welding tool 36. The welding tool 36 has a substantially cylindrical main part 37, and a tapered pin 38 axially projecting from one end of the main part 37. The rotating welding tool 36 is pressed against the workpiece 34 so as to dig into the workpiece 34. Then, the workpiece 34 is partly fluidized by frictional heat and the fluidized part is stirred by solid-phase stirring. The fluidized parts of the workpiece 34 are mixed, the fluidized parts solidifies to weld the workpieces 32 and 33 together. The workpieces 32 and 33 are, for example, aluminum alloy workpieces.

Figure 10:
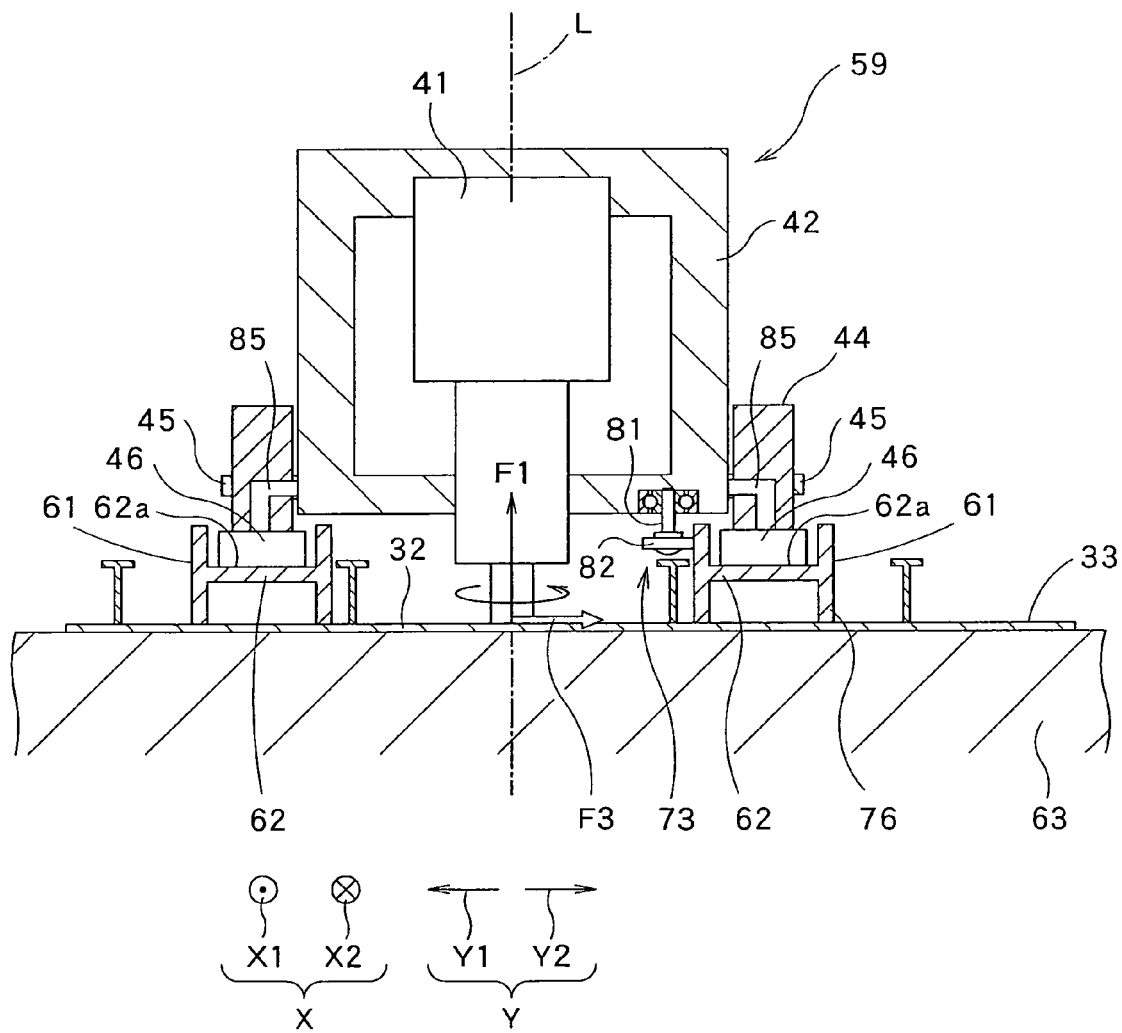
FIG. 10 is a sectional view of a welding machine 59 in a second embodiment according to the present invention.

The welding machine 31 includes a tool holding device 41 shown in FIG. 10 capable of rotating about a predetermine reference axis L and holding the welding tool, a rotational driving means for driving the tool holding device 41 for rotation about the reference axis L, a linear driving means for driving the tool holding device 41 for linear movement along the reference axis L, a vehicle 42 carrying the tool holding device 41, the rotational driving means and the linear driving means and capable of traveling, and attracting devices 43. The attracting devices 43 are not shown in FIG. 2 to facilitate understanding.

The tool holding device 41 holds the welding tool 36 detachably. The welding tool 36 is mounted on the tool holding device 41 with its axis aligned with the reference axis L of the welding machine 31. The tool holding device 41 is mounted on the vehicle 42 so as to be rotatable about the reference axis L relative to the vehicle 42 and to be linearly movable along the reference axis L. In the description of this embodiment, directions parallel to the reference axis L will be referred to as axial directions A, a direction in which the welding machine 31 travels along the joint line 39 will be referred to as traveling direction X and a direction perpendicular to the surface of the workpiece 34 will be referred to as a vertical direction Z. A direction perpendicular to a plane defined by lines extending respectively in the traveling direction X and the vertical direction Z will be referred to as a lateral direction Y.

The rotational driving means includes a rotational force producing device capable of producing the rotational force for rotating the tool holding device 41 about the reference axis L, and a rotation transmitting device for transmitting the rotational force produced by the rotational force producing device to the tool holding device 41. Practically, the rotational force producing device is an electric motor, such as an induction motor or a servomotor, and the rotation transmitting device is a transmission gear including gears and a gear box rotatably supporting the gears. The rotation transmitting device lowers the rotating speed of the output shaft of the servomotor and applies rotational force to the tool holding device 41. The rotation transmitting device may be a device other than the transmission gear, such as a belt-drive device. The rotation transmitting device may be a shaft coupling simply for connecting the output shaft of the motor and the holding unit 41 for power transmission.

The linear driving means is provided with a power unit that generates power for shifting the tool holding device 41 in the axial direction A. Practically, the power unit is, for example, a power cylinder. This embodiment uses a double-acting pneumatic cylinder as the power unit.

In this embodiment, the vehicle 42 has a shape resembling a rectangular parallelepiped. The tool holding device 41, the rotational driving means and the linear driving means are mounted on the vehicle 42. The bottom wall of the vehicle 42 is provided with an opening penetrating the bottom wall in the vertical direction Z. The tool holding device 41 can be projected from the vehicle 42 in the axial direction A.

The vehicle 42 is provided with two pairs of wheels 44, namely, four wheels 44, and two axles 45 supporting the two pairs of wheels 44, respectively.

The shape of the vehicle 42 is not limited to a rectangular parallelepiped. The vehicle 42 may have a U-shape having one open end opening in the forward traveling direction, namely, a forward traveling direction X1, or in the rearward traveling direction, namely, a rearward traveling direction X2, and the tool holding device 41 may be disposed so as to be capable of being projected from the vehicle 42 through the open end in the axial direction A. When the vehicle 42 is thus formed, the two wheels 44 on the side of the closed end are supported on the single axle 45, while the two wheels 44 on the side of the open end are supported on two axles 45, respectively.

Figure 3:
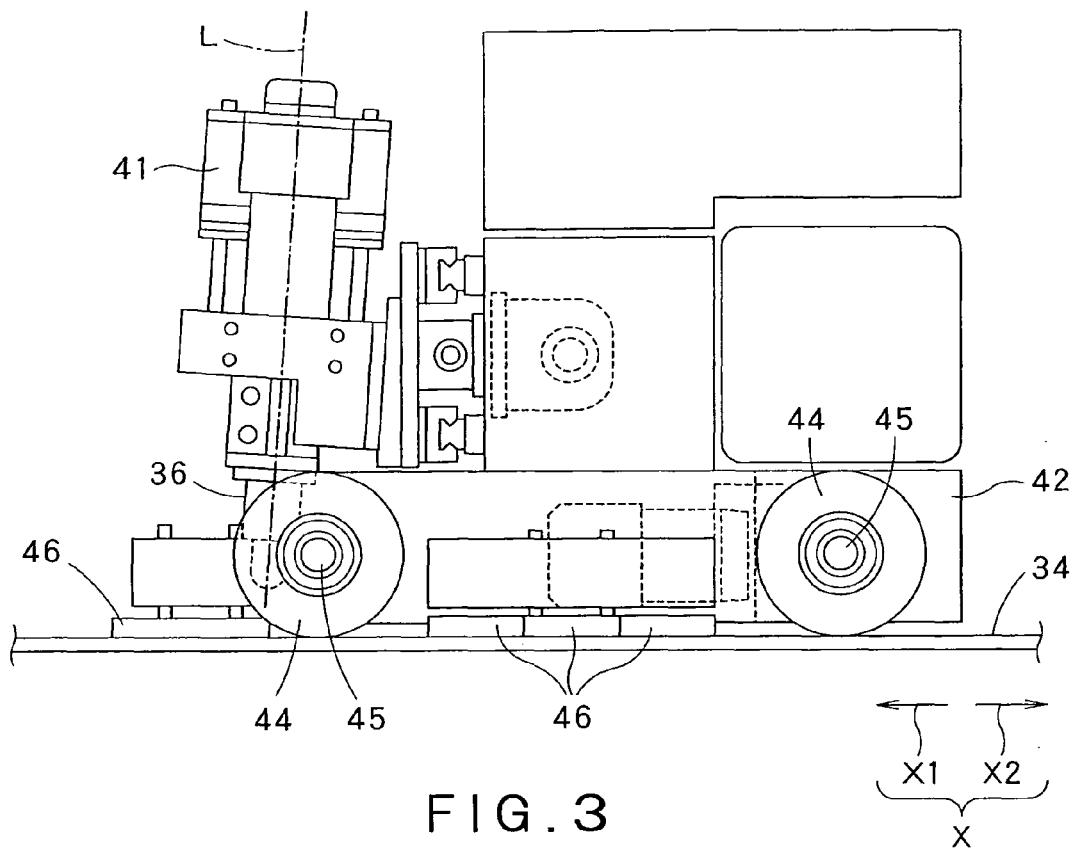
FIG. 3 is a partially cutaway view of a welding machine 15, in which a front part of a vehicle 42 with respect to a forward traveling direction X1 is opened in a U-shape.
Figure 4:
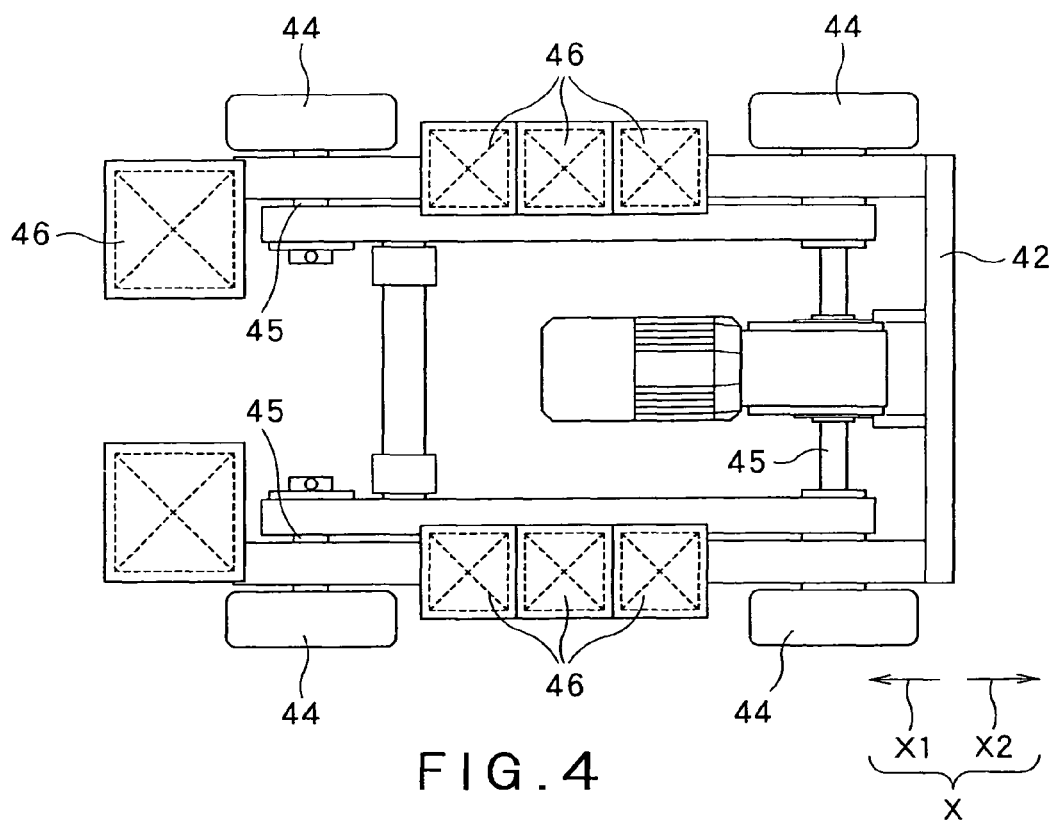
FIG. 4 is a bottom view of the welding machine 15 in which a front part of the vehicle 42 with respect to the forward traveling direction X1 is opened in a U-shape.

FIG. 3 is a side elevation of a welding machine 15 including a vehicle 42 having a U-shaped front open end opening in the forward traveling direction X1. FIG. 4 is a bottom view of the welding machine 15 including the vehicle 42 having the U-shaped front open end opening in the forward traveling direction X1. In FIG. 4, a welding tool 36 and a tool holding device 41 are omitted to facilitate understanding.

The welding machine 31 includes a traveling means. The traveling means includes a wheel driving motor mounted on the vehicle 42, and a rotation transmitting means for transmitting the rotational force of the wheel driving motor to the wheels 44. The wheel driving motor and the rotation transmitting means are mounted on the vehicle 42. In this embodiment, the rotation transmitting means is a belt-drive mechanism. A belt included in the belt-drive mechanism is extended between the output shaft of the wheel driving motor and the axle 45. The wheels 44 are driven for rotation by rotating the output shaft of the wheel driving motor. All the four wheels may be driven for rotation through rotation transmitting means by the wheel driving motor in a 'four-wheel drive' mode. Practically, the wheel driving motor may be a hydraulic motor. The vehicle 42 provided with the traveling means is mobile.

Figure 5:
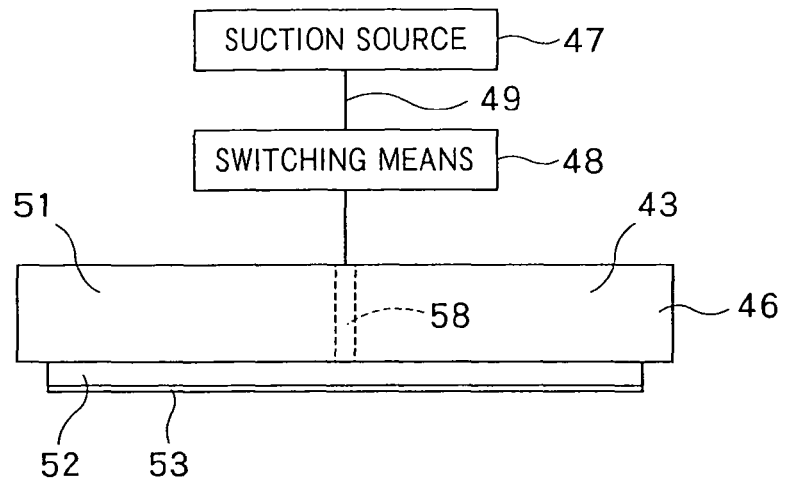
FIG. 5 is a typical view of assistance in explaining the operation of an attracting device 43.
Figure 6:
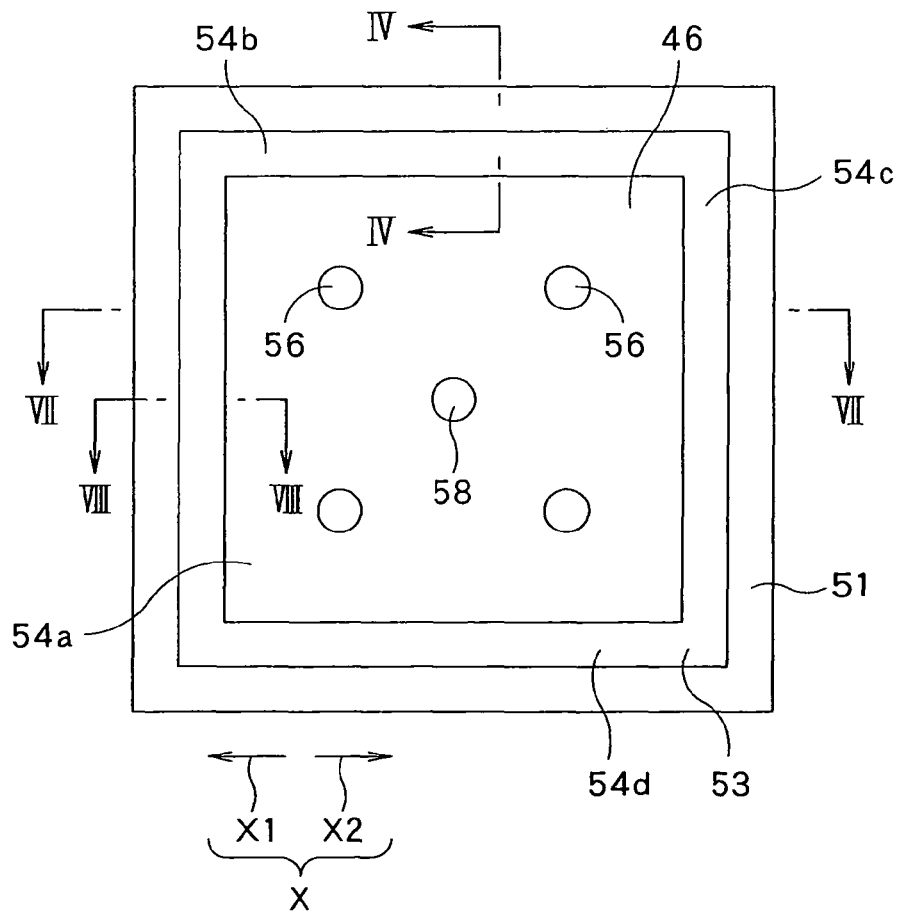
FIG. 6 is a bottom view of a sticking pad 46.
Figure 7:
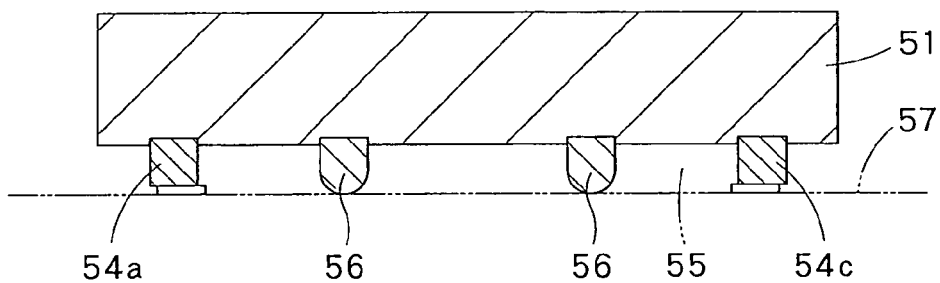
FIG. 7 is a sectional view of the sticking pad 46 taken on the line VI-VI in FIG. 6.

FIG. 5 is a typical view of assistance in explaining operations of the attracting device 43. FIG. 6 is a bottom view of a sticking pad 46. FIG. 7 is a sectional view of the sticking pad 46 taken on the line VII-VII in FIG. 6. The attracting device 43 includes one or plural sticking pads 46 capable of applying attraction to the welding tool to hold the welding tool in contact with the workpiece 34 when placed in contact with the workpiece 34, a suction source 47 for sucking air filling a suction space 55 to produce attraction, one or plural switching means 48 for selectively setting the sticking pads 46 in either of the operative state and the inoperative state, and pipes 49 each connecting the sticking pad 46 to the suction source 47.

The attracting device 43 of the first embodiment is provided with eight sticking pads 46. The four sticking pads 46 among the eight sticking pads 46 are arranged on or along a straight line connecting the two wheels 44 on the side of a first lateral direction Y1 at a position on the front side with respect to the forward traveling direction X1 of the wheel 44 on the front side with respect to the forward traveling direction X1 and at positions between the two wheels 44, respectively. When the welding tool is disposed in a middle part of the vehicle 42 instead of in a front part of the vehicle 42, it is desirable to dispose a sticking pad 46 at a position on the rear side with respect to the rearward traveling direction X2 of the wheel 44 on the rear side with respect to the rearward traveling direction X2. The other four sticking pads 46 among the eight sticking pads 46 are arranged on or along a straight line connecting the two wheels 44 on the side of a second lateral direction Y2 at a position on the front side with respect to the forward traveling direction X1 of the wheel 44 on the front side with respect to the forward traveling direction X1, at positions between the two wheels 44, and at a position on the rear side with respect to the rearward traveling direction X2 of the wheel 44 on the rear side with respect to the rearward traveling direction X2.

Referring to FIG. 4, the two large sticking pads 46 disposed at positions on the front side of the vehicle 42 among the eight sticking pads 46 are main sticking pads 46 for exerting a high attraction on the vehicle 42 to keep the welding tool in contact with the workpiece 34. The six sticking pads 46 disposed between the two wheels 44 are auxiliary sticking pads 46 for adjusting an attracting state in which the vehicle 42 is attracted to the workpiece 34 by the main sticking pads 46. The number and positions of the auxiliary sticking pads 46 are selectively determined taking into consideration the quality of the workpiece 34 such that the vehicle 42 can be properly attracted to the workpiece 34 by the sticking pads 46. For example, most part of an auxiliary attraction can be exerted on a rear part of the vehicle 42 by omitting the front end one of the three auxiliary sticking pads 46 arranged along the straight line as shown in FIG. 4.

Each of the sticking pads 46 has a flat base member 51 connected to a lower part on the side of a downward vertical direction Z2 of the vehicle 42 so as to face an object, an annular sealing member 52 protruding from one of major surfaces of the base member 51 so as to surround a central area of the surface of the base member 51, a slippery member 53 attached to the end surface of the annular sealing member 52 facing the object, and one or some deformation-suppressing protrusions 56 protruding from the surface facing the object of the base member 51. In this embodiment, the workpiece 34 is the object, and the sticking pads 46 stick to the workpiece 34.

The base member 51 has a substantially square shape. The base member 51 has a lower surface facing the workpiece 34. The base member 51 is provided with a suction port 58 in a central part of the part thereof surrounded by the annular sealing member 52. The annular sealing member 52 corresponds to a flexible, elastic, airtight sealing member. The annular sealing member 52 has the shape of a frame having four sides extending along the four sides of the base member 51, respectively. An upper part of the annular sealing member 52 on the side of an upward vertical direction Z1 is closely embedded in the base member 51. The annular sealing member 52 is made of a foamed rubber, such as foamed natural rubber, foamed chloroprene rubber, foamed ethylene-propylene rubber, foamed nitrile rubber or foamed silicone rubber.

The slippery member 53 is made of a material that can make the slippery member 53 contact the workpiece with a friction coefficient lower than that with which the sealing member 52 can be in contact with the same workpiece. The slippery member 53 of the first embodiment is formed in the shape of a square frame conforming to the continuous, square end surface of the sealing member 52. The slippery member 53 is made of a fluorocarbon resin. Suitable fluorocarbon resins excellent in sliding performance, having a low frictional property, and excellent in heat resistance for forming the slippery member 53 are polytetrafluoroethylene resins (PTEFEs), tetrafluoroethylne perfluroalcoxyvinyl ether resins (PFAs) and tetrafluoroethylene resins (FEPs). Polychlorotrifluoroethylene resins (PCTEFs) and tetrafluoroethylene copolymers (ETFEs) also are suitable materials for forming the slippery member 53.

Figure 8:
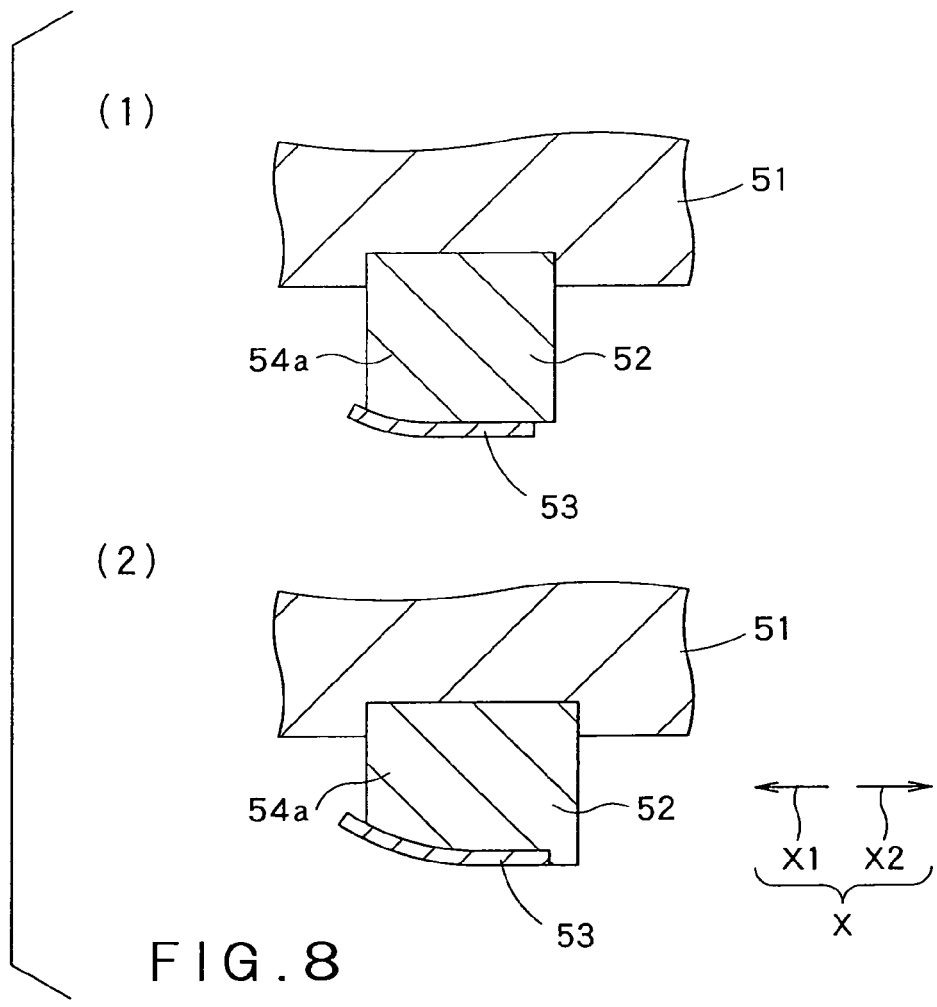
FIG. 8 is a sectional view of the sticking pad 46 taken on the line VIII-VIII in FIG. 6.

FIG. 8 is a fragmentary sectional view of the sticking pad 46 taken on the line VIII-VIII in FIG. 6. FIGS. 8(1) and 8(2) show the sticking pad 46 in an inoperative state and in an operative state, respectively. The slippery member 53 is formed in a frame having four side members 54a, 54b, 54c and 54d having the shape of a thin plate. When the sticking pad 46 is viewed from the side on the side of the downward vertical direction Z2, a front edge part of the front side member 54a extends forward slightly beyond the front edge of a front side member of the sealing member 52 in the forward traveling direction X1, and the rear edge of the front side member 54a is retracted slightly inward in the forward traveling direction X1 from the rear edge of the front side member of the sealing member 52. Preferably, a front edge part of the front side member 54a on the side of the forward traveling direction X1 is sloped up in the upward vertical direction Z1. The rear side member 54c on the side of the rearward traveling direction X2 is placed on the rear side member of the sealing member 52 similarly to the front side member 54a on the side of the forward traveling direction X1. The front edge part of the rear side member 54c on the side of the forward traveling direction X1 extends forward slightly beyond the front edge of the rear side member of the sealing member 52 in the forward traveling direction X1, and the rear edge of the rear side member 54c on the side of the rearward traveling direction X2 is retracted slightly inward in the forward traveling direction X1 from the rear edge of the rear side member of the sealing member 52.

Figure 9:
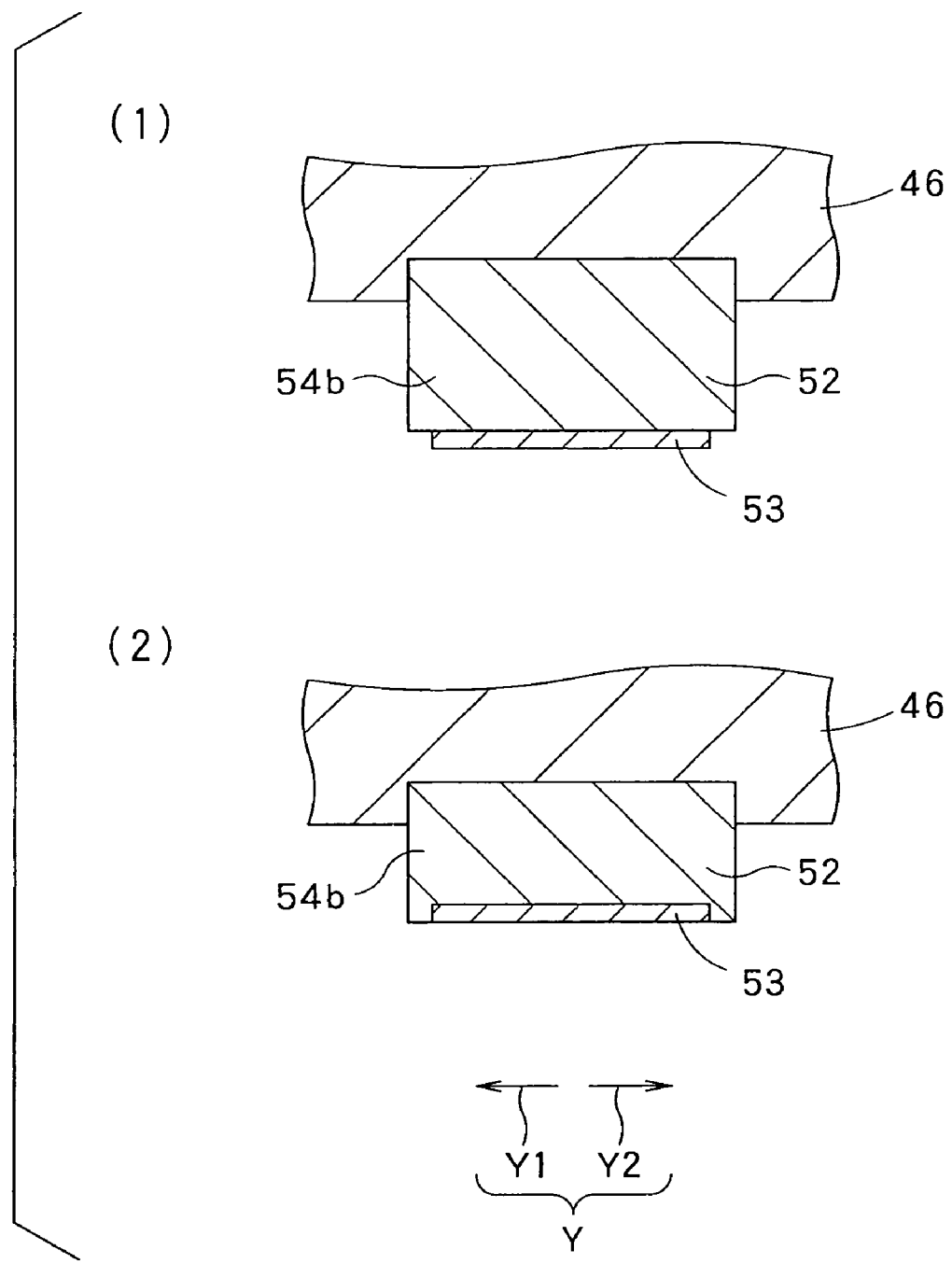
FIG. 9 is a sectional view of the sticking pad 46 taken on the line IV-IV in FIG. 6.

FIG. 9 is a sectional view of the sticking pad 46 taken on the line IV-IV in FIG. 6. FIGS. 9(91) and 9(2) show the sticking pad 46 in an inoperative state and in an operative state, respectively. The lateral side member 54b on the side of the first lateral direction Y1 has a width, namely, a dimension along the lateral direction Y, smaller than that of the lateral side member of the sealing member 52. When the sticking pad 46 is viewed from the side on the side of the downward vertical direction Z2, the opposite side edges of the lateral side member 54b are on the inner side of the opposite side edges of the lateral side member of the sealing member 52. In other words, when the sticking pad 46 is viewed from the side on the side of the downward vertical direction Z2, side edge parts of the lateral side member of the sealing member 52 extend beyond the side edges of the lateral side member 54b in the opposite lateral directions Y, respectively. The lateral side member 54d on the side of the second lateral direction Y2 is disposed similarly to the lateral side member 54b on the side of the first lateral direction Y1.

The deformation-suppressing protrusions 56 extend toward the object in the suction space 55. The deformation-suppressing protrusions 56 extend in the downward vertical direction Z2 from the base member 51 to an imaginary plane 57 containing the sliding surface of the slippery member 53 in contact with the object. The deformation-suppressing protrusions 56 extend to the imaginary plane 57 or to positions at a short distance in the upward vertical direction Z1 from the imaginary plane 57. Base end parts of the deformation-suppressing protrusions 56 on the side of the upward vertical direction Z1 are securely embedded in the base member 51. The deformation-suppressing protrusions 56 have rigidity higher than that of the sealing member 52. The deformation-suppressing protrusions 56 are made of a material that can make the tips of the deformation-suppressing protrusions contact the object with a friction coefficient lower than that with which the sealing member 52 is in contact with the object. The end parts of the deformation-suppressing protrusions 56 of the first embodiment are tapered toward the object and have hemispherical tips, respectively. The number of the deformation-suppressing protrusions 56 of the first embodiment is four. The four deformation-suppressing protrusions 56 are disposed at positions dividing the distance between the front side member 54a on the side of the forward traveling direction X1 and the rear side member 54c on the side of the rearward traveling direction X2 into three equal sections and dividing the distance between the lateral side member 54b on the side of the first lateral direction Y1 and the lateral side member 54d on the side of the second lateral direction Y2 into three equal sections, respectively. The deformation-suppressing protrusions 56 are made by machining a material excellent in abrasion resistance, such as a stainless steel or a hardened steel, in the shape of a ball or a roller. The deformation-preventing protrusions 56 may be members made of a metal, such as a steel or an aluminum alloy, or a rigid nonmetallic material, such as an FRP, and each having a tip facing the object and provided with a member of the same material as the slippery member 53 attached to the sealing member.

The suction source 47 sucks air filling the suction space 55 defined by the base member 51, the sealing member 52 and the slippery member 53 through the suction port 58 and a suction line formed by the pipe 49 to evacuate the suction space 55 at a vacuum. Consequently, the base member 51 is pressed against the object by the atmospheric pressure to press the vehicle 42 against the object. Thus, the vehicle is prevented from separating from the workpiece 34 when the welding tool 36 is pressed against the workpiece 34. Practically, the suction source 47 is a vacuum pump, such as a hydraulic rotary pump, a hydraulic diffusion pump or a turbo molecular drag pump. As shown in FIGS. 8(2) and 9(2), the sealing member 52 is compressed and deformed, the slippery member 53 sinks in the sealing member 52 and sealing member 52 comes into partial contact with the object when the base member 51 is pressed against the object. Consequently, the sealing member 52 surrounding the suction space 55 comes into contact with the object to seal the suction space 55 in a high airtight state.

Each of the switching means 48 is connected to the suction source 47 and the suction port 58 by suction lines. The switching means 48 selectively sets the sticking pad 46 in either of the operative state in which the sticking pad 46 is made to stick to the object by evacuating the suction space 55 and the inoperative state in which the sticking pad 46 is not made to stick to the object by disconnecting the suction port 58 from the suction source 47 to stop sucking out air from the suction space 55. The switching means 48 are, for example, electromagnetic valves.

In this embodiment, the attracting device 43 is provided with the eight switching means 48 corresponding to the eight sticking pads 46. Each sticking pad 46 is connected through each switching means 48 to the suction source 47. Thus, the sticking pads 46 are set individually in the operative state or the inoperative state. In another embodiment, only the sticking pads 46 to be set selectively in the operative state or the inoperative state may be connected through the switching means 48 to the suction source 47. The switching means 48 may be connected to the plural sticking pads 46 by pipes to set the plural sticking pads 46 simultaneously in the operative state or the inoperative state.

Description will be made of a friction stir welding procedure using the welding machine 31 in the first embodiment for welding together the workpieces 32 and 33. The welding machine 31 is provided with a control means. The control means executes an operation program read from a storage device, provides instructions according to a predetermined friction stir welding procedure to control the rotational driving means, the linear shifting means, the traveling means and the suction device 43. The welding machine 31 executes the following operations on the basis of the instructions provided by the control means. The control means is, for example, a microcomputer provided with a CPU (central processing unit), and storage devices, such as a ROM (read-only memory) and a RAM (random=access memory).

The operator places the workpieces 32 and 33 on the floor of a workshop or on a surface plate and holds the workpieces 32 and 33 edge to edge by tack welding or with a restraint jig such that a dislocation and a gap between the workpieces 32 and 33 are below allowances. Then, the operator locates the welding machine 31 at a welding starting point. Then, the welding machine 31 starts a welding operation.

First, the attracting device 43 operates to set the sticking pads 46 in the operative state so that the sticking pads 46 stick to the workpiece 34. Subsequently, the rotational driving means is actuated to rotate the welding tool 36 together with the tool holding device 41. Then, the linear shifting means is actuated to move the welding tool 36 rotating together with the tool holding device 41 toward the workpiece 34 along the reference axis L. The axis L1 of the welding tool 36 is sloped down toward the forward traveling direction X1 in a vertical imaginary plane containing the weld line 39 and perpendicular to the lateral direction Y. The angle θ between the reference axis L and the vertical direction Z is in the range of 1° to 5° The welding tool 36 inclined at the angle θ to the vertical is engages with the workpiece 34 and sinks into the workpiece 34. Thus, a large amount of heat can be generated by friction between the welding tool 36 and the workpiece 34 when the welding machine travels.

The control means controls the linear shifting means such that the pin 38 of the welding tool 36 sinks into the workpiece by a predetermined depth. When the operating speed of the electric motor is controlled in a feedback control mode, it is decided that the pin 38 has sunk in the workpiece 34 by the predetermined depth upon the increase of a current supplied to the electric motor beyond a predetermined threshold because current demanded by the electric motor changes according to torque exerted by the welding tool 36 on the workpiece 34. A decision as to whether or not the pin 38 has sunk into the workpiece 34 by the predetermined depth may be made on the basis of time that has elapsed since an instruction to drive the pin 38 into the workpiece 34 was given.

Then, the rotating speed of the welding tool 36 is changed for a traveling rotating speed when necessary. For example, when the workpieces 32 and 33 are thick plates, it is preferable that a set rotating speed at which the welding tool 36 is rotated when the pin 38 is driven into the workpiece 34 is higher than the traveling rotating speed. Thus, a time in which the welding tool 36 sinks into the workpiece 34 can be reduced.

After a part of the workpiece 34 has been sufficiently fluidized in a predetermined time after stopping the liner shifting of the welding tool 36, the traveling means drives the wheels 44 for rotation. Then, the rotating welding tool 36 partly sunk into the workpiece is moved continuously in the forward direction along the weld line 39 as shown in FIG. 2 to weld together the workpieces 32 and 33.

After the vehicle 42 has traveled a predetermined traveling distance since the vehicle 42 started traveling, the traveling means stops rotating the wheels 44 to stop the vehicle 42. When an encoder is incorporated into the wheel driving motor, the angular position of the wheel 44 is determined on the basis of a signal provided by the encoder, the distance traveled by the vehicle 42 is determined on the basis of the angular position. The traveling means may stop driving the wheels 44 for rotation, when a vehicle stopping switch attached to a front part on the side of the forward traveling direction X1 of the vehicle 42 is actuated by a switch actuating member disposed such that the switch actuating member actuates the vehicle stopping switch upon the arrival of the vehicle at a stopping position. The vehicle stopping switch 84 may be, for example, a touch switch or a proximity switch.

After the vehicle 42 has stopped, the linear shifting means operates to move the tool holding device 41 and the welding tool 36 away from the workpiece 34 along the reference axis L so that the welding tool 36 is separated from the workpiece 34. Then, the operation of the rotational driving means is stopped to complete the friction stir welding procedure.

The vehicle 42 travels along the weld line 39 in the workpiece 34 with the tip 38 of the welding tool 36 sunk into the workpiece 34 to form a welded structure by welding together the workpieces 32 and 33.

Each of the sticking pads 46 of the welding machine 31 in the first embodiment includes the sealing member 52 and the slippery member 53. The slippery member 53 is made of a material that can make the slippery member 53 contact the object with a friction coefficient lower than that with which the sealing member 52 can be in contact with the object. The slippery member 53 comes into contact with the object when the sticking pad 46 is brought into contact with the object. The sticking pad 46 thus formed can slide more easily along the surface of the object than an ordinary sticking pad not provided with a member like the slippery member 53. Therefore, a low reverse force acts in the rearward traveling direction X2 on the welding machine 31 when the welding tool 36 moves in the forward traveling direction X1. Consequently, the vehicle 42 can be driven for movement by a low driving force and friction stir welding can be carried out at a high welding speed. Since the welding machine 31 is provided with the sticking pads 46, the wheels 44 of the welding machine 31 can be prevented from being separated from the workpiece 34 by the axial reaction force acting in the axial direction A without weighting the welding machine 31, and the welding machine 31 can be prevented from meandering, can achieve intended travel and can be formed in a lightweight structure.

The respective front edge parts on the side of the forward traveling direction X1 of the side members 54a and 54c respectively on the side of the forward traveling direction X1 and the rearward traveling direction X2 of the slippery member 53 extend in the forward traveling direction X1 beyond the front edges of the front and the rear side member of the sealing member 52. Therefore, the slippery member 53 can easily slide even when the sticking pad 46 is in the operative state, and the travel reaction force is low. Since the slippery member 53 does not cover the end surface of the sealing member 52 entirely, the suction space 55 can be sealed in a high airtight state by an part in contact with the object of the end surface of the sealing member 52 not covered with the slippery member 53.

In the welding machine 31 in the first embodiment, the deformation-suppressing protrusions 56 extend in the suction space 55 from the sealing member toward the imaginary plane 57 containing the sliding surface of the slippery member 53 in contact with the object. Since the rigidity of the deformation-suppressing protrusions 56 is higher than that of the sealing member 52, the deformation-suppressing protrusions come into contact with the workpiece 34 and can prevent the workpiece 34 from warping when the sticking pads 46 stick to the workpiece 34, even if the workpiece 34 is thin and has a low rigidity. If the workpiece 34, it is possible that workpiece 34 is deformed by friction stir welding, and that a gap is formed between each sticking pad 46 and the workpiece 34 to increase the pressure in the suction space 55 causing attraction to decrease. When the workpiece 34 is prevented from warping, such troubles attributable to warped workpiece 34 can be avoided. Since the surfaces of the protrusions are made of a material capable of being in contact with the object with a friction coefficient lower than that with which the sealing member is in contact with the object, increase in the travel reaction force acting on the welding machine 31 can be suppressed to the least possible extent even if the deformation-suppressing protrusions 56 are in contact with the object.

Although the sticking pad 46 of the first embodiment has the base member 51 provided in its central part with the suction port 58, the suction port 58 may be formed at any position in an part of the base member 51 surrounded by the sealing member 52. When the suction port 58 is not formed in a central part of the base member 51, the deformation-suppressing protrusion 56 may be formed on the central part of the base member 51. A member of the same material as the slippery member 53 may be attached to the tips of the deformation-suppressing protrusions 56 to reduce the friction coefficient with which the deformation-suppressing protrusions 56 are in contact with the object so that the travel reaction force is reduced.

FIG. 10 shows a welding machine 59 in a second embodiment according to the present invention. Since the welding machine 59 in the second embodiment is substantially the same in construction as the welding machine 31 in the first embodiment, parts of the welding machine 59 like or corresponding to those of the welding machine 31 are designated by the same reference characters and the description thereof will be omitted to avoid duplication.

Guide rails 61 are extended parallel to a weld line. The rigidity of the guide rails 61 is higher than that of a part of a workpiece 34 to be attracted. In the second embodiment, the two guide rails 61 are extended on a surface of the workpiece 34 on one side of the weld line 39 on the side of the first lateral direction Y1 and on the other side of the weld line 39 on the side of the second lateral direction Y2 at equal distances from the weld line 39, respectively. In the second embodiment, the guide rails 61 are steel H-beams. Each of the guide rails 61 is disposed with its web 62 extending between flanges substantially parallel to the surface of the workpiece 34. The welding machine 59 and the guide rails 61 constitute a friction stir welding system embodying the present invention.

The welding machine 59 is provided with wheels 44 and is disposed such that the wheels 44 roll on surfaces 62a (hereinafter, referred to as guide surfaces 62a") of the webs 62 of the guide rails 61. The wheels 44 roll on the guide surfaces 62a when the welding machine 59 moves. Sticking pads 46 come into contact with and stick to the guide surfaces 62a of the guide rails 61. In the second embodiment, the guide rails 61 are objects to which the sticking pads 46 stick. Each of the sticking pads 46 is attached to the lower end of an L-shaped, arm 85 attached to a frame included in a vehicle 42.

The guide rails 61 are fixed to, for example, a surface plate 63 on which the workpiece 34 is placed. End parts of the guide rails 61 extend beyond the opposite ends of the workpiece 34 with respect to a traveling direction X. The guide rails 61 are fixed to the surface plate 63 by angles attached to the surface plate 63 with bolts or by welding.

The guide rails 61 are fixed to, for example, the surface plate 63 on which the workpiece 34 is placed. End parts of the guide rails 61 extend beyond the opposite ends of the workpiece 34 with respect to a traveling direction X. The guide rails 61 are fixed to the surface plate 63 by the angles attached to the surface plate 63 with the bolts or by welding.

The guide surfaces 62a are finished by a predetermined process such that the sticking pads 46 can be in contact with the guide surfaces 62a with a low friction coefficient. For example, the surfaces of the webs 62 are coated with a film of a coating material that can be in contact with the sticking pads 46 with a low frictional coefficient or the surfaces of the webs 62 are ground in a low surface roughness. Suitable coating materials as the coating material for coating the surfaces of the webs 62 are, for example, fluorocarbon resin coating materials, silicone resin coating materials, urethane resin coating materials, acrylic resin coating materials and epoxy resin coating materials. The surfaces of the webs 62 are finished by the foregoing process such that the rotating wheels 44 do not slip relative to the guide surfaces 62a.

The welding machine 59 in the second embodiment is provided with a second guide member 73. The second guide member 73 includes a second shaft 81 supported on a part near an end of a lower member on the side of the downward vertical direction Z2 of the vehicle 42 on the side of the second lateral direction Y2 so as to extend in the downward vertical direction Z2, and a cylindrical second roller 82 rotatably supported on the second shaft 81. The second roller 82 is coaxial with the second shaft 81 and rotates about an axis parallel to the vertical direction Z. A welding machine 71 travels in the moving direction X for friction stir welding with the second roller 82 in contact with the flange 76 on the side of the first lateral direction Y1 of the guide rail 61 on the side of the second lateral direction Y2 from the first lateral direction Y1. The flange 76 on the side of the first lateral direction Y1 of the guide rail 61 on the side of the second lateral direction Y2 corresponds to a vertical guide part having a vertical guide surface perpendicular to the surface of the workpiece 34. The surface on the side of the first lateral direction Y1 of this flange 76 corresponds to the vertical guide surface.

A friction stir welding procedure in this embodiment differs from the friction stir welding procedure in the foregoing embodiment only in the surfaces on which the wheels 44 roll and in the surfaces to which the sticking pads 46 stick and hence description thereof will be omitted to avoid duplication.

The sticking pads 46 of the welding machine 59 in the second embodiment stick to the guide rails 61. The guide rails 61 have a rigidity higher than that of the workpiece 34 to which the sticking pads stick and deform scarcely when the sticking pads 46 stick to them. The workpiece 34 can be prevented from being deformed during friction stir welding by making the sticking pads 46 stick to the guide rails 61.

In the welding machine 59 in the second embodiment, the guide surfaces 62a of the guide rails 61 are processed by the predetermined process such that the sticking pads 46 can be in contact with the guide surfaces 62a with a low friction coefficient. Therefore, the reverse force that acts on the sticking pads 46 when the welding machine 59 travels can be reduced. Since the wheels 44 are not in contact with the workpiece 34 when the welding machine 59 travels, the workpiece 34 can be prevented from being damaged during friction stir welding.

The welding machine 59 in the second embodiment travels with the second guide member 73 in contact with the guide rail 61. Thus the reaction force F3 resulting from the rotation of a welding tool 36 included in the welding machine 59 can be born by the guide rail 61, the welding machine 59 can be restrained from meandering and can achieve intended travel even if friction stir welding is carried out at a high welding speed. Thus, an intended part of the workpiece 34 can be welded by the welding tool 36 by friction stir welding.

Although the second embodiment uses the H-beams as the guide rails 61, members of any shape, such as the shape of a quadrangular prism, can be used as the guide rails 61, provided that the sticking pads 46 can stick to the members and the wheels 44 can roll on the members. The second guide member 73 of the welding machine 59 may be omitted.

Figure 11:
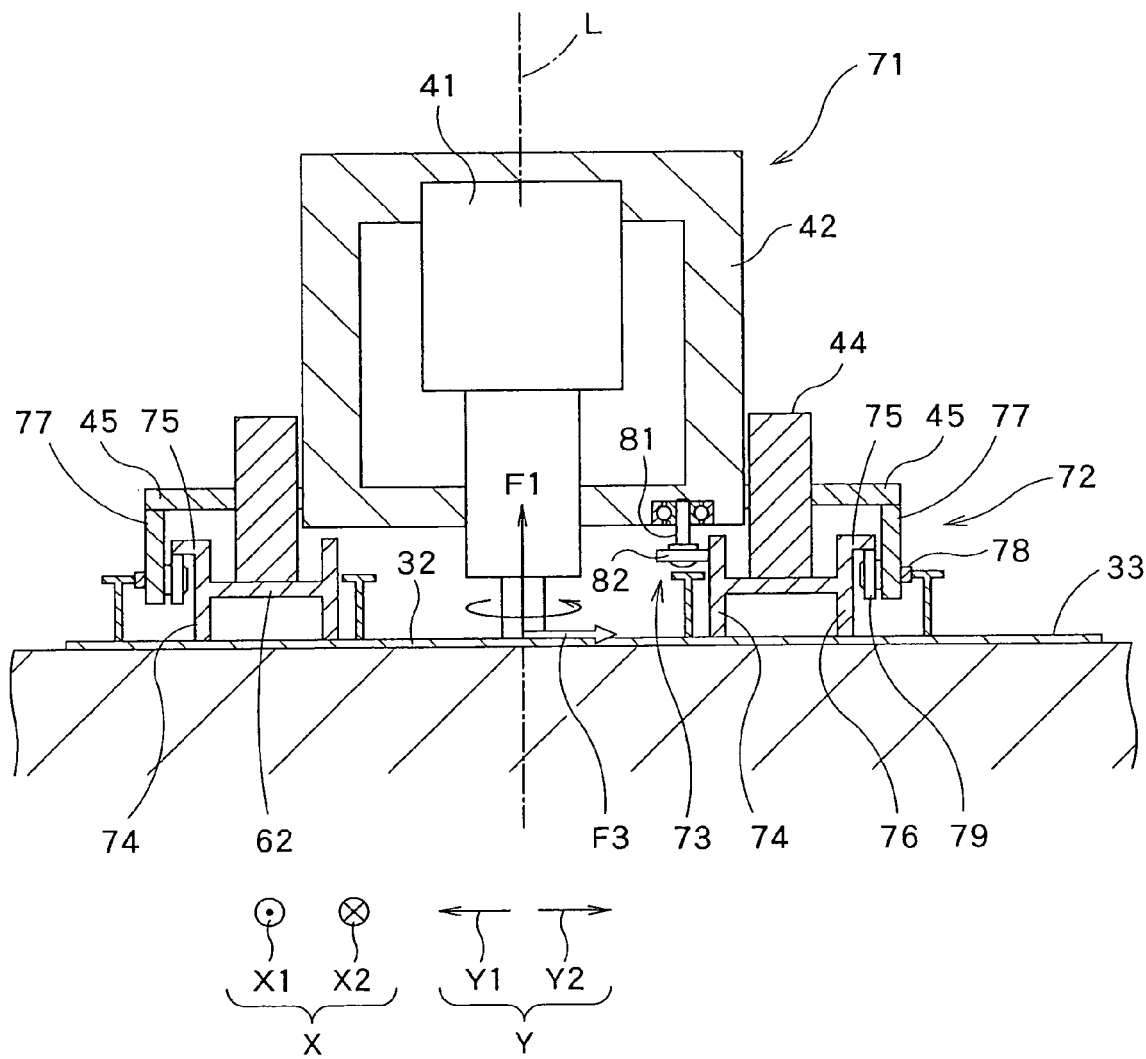
FIG. 11 is a sectional view of a welding machine 71 in a third embodiment according to the present invention.

FIG. 11 is a sectional view of a welding machine 71 in a third embodiment according to the present invention. The welding machine 71 in the third embodiment is built by adding first guide members 72 and a second guide member 73 of the same construction as the second guide member 73 of the second embodiment to and omitting the attracting device 43 from the welding machine 59 in the second embodiment. The welding machine 71 in the third embodiment is substantially the same in construction as the welding machine 59 in the second embodiment and hence parts of the welding machine 71 like or corresponding to those of the welding machine 59 are designated by the same reference characters and the description thereof will be omitted to avoid duplication. A friction stir welding system embodying the present invention includes the welding machine 71 in the third embodiment and guide rails 74. The welding machine 71 may be provided with the foregoing attracting device 43 in addition to the first guide members 72 and the second guide members 73. The first guide members 72 may be omitted and the welding machine 71 may be provided with the second guide members 73 and the attracting device 43.

The guide rails 74 of the third embodiment have longitudinal guide strips 75 parallel to the surfaces of the workpieces 32 and 33, respectively. The guide rails 74 of the third embodiment are formed by forming the longitudinal guide strips 75 integrally with the outer flanges 76 of H-beams similar to those of the second embodiment so as to extend in the lateral directions Y, respectively. The longitudinal guide strips 75 extend between the opposite ends of the H-beams with respect to the traveling direction X. The longitudinal guide strip 75 of the guide rail 74 on the side of the lateral direction Y1 extends in the lateral direction Y1 from the upper end on the side of the upward vertical direction Z1 of the flange 76 on the side of the lateral direction Y1. The longitudinal guide strip 75 of the guide rail 74 on the side of the lateral direction Y2 extends in the lateral direction Y2 from the upper end on the side of the upward vertical direction Z1 of the flange 76 on the side of the lateral direction Y2.

Axles 45 respectively supporting wheels 44 of the third embodiment extend from the wheels 44 in the lateral direction Y beyond the outer ends of the longitudinal guide strips 75, respectively. Each of the first guide members 72 includes a down support arm 77 extending in the downward vertical direction Z2 from the outer end of the axle 45, a first shaft 78 penetrating a lower part on the side of the downward vertical direction Z2 of the down support arm 77 in the lateral direction Y, fixed to the down support arm 77 and extending in the lateral direction Y toward the guide rail 74, and a cylindrical first roller 79 rotatably supported on the first shaft 78. The first roller 79 and the first shaft 78 are coaxial. The first roller 79 rotates about an axis parallel to the lateral direction Y. The welding machine 71 travels in the traveling direction X for friction stir welding with the first rollers 79 in contact with the down support arms 77.

A friction stir welding procedure in this embodiment differs from the friction stir welding procedure in the foregoing embodiment only in that sticking pads 46 do not stick to the object and the welding machine 71 travels with the first guide members 72 and the second guide members 73 in contact with the guide rails 74, respectively, and hence the further description thereof will be omitted to avoid duplication.

The welding machine 71 in the third embodiment travels with the first guide members 72 in contact with the surfaces facing the workpiece 34 of the longitudinal guide strips 75, respectively. Thus, the axial reaction force F1 counteracting the pressure applied to the workpiece 34 by the welding tool 36 can be cancelled out, the wheels 44 can be prevented from separating from the workpiece 34, intended traveling can be achieved, and intended parts can be welded together by friction stir welding with the welding tool 36 at a high welding speed even if friction stir welding is carried out at a high welding speed.

The welding machine 71 in the third embodiment travels with the second guide members 73 in contact with the guide rails. Thus, the lateral reaction force F3 resulting from the rotation of the welding tool 36 can be cancelled out, the friction stir welding machine can be restrained from meandering, intended travel can be achieved, and intended parts can be welded together by friction stir welding with the welding tool 36 at a high welding speed even if friction stir welding is carried out at a high welding speed.

In a modification of the welding machine of the present invention, spherical rolling members may be brought into contact with L-shaped corners each at the joint of the flange 76 and the longitudinal guide strip 75 instead of the first rollers 79 and the second rollers 82. Since each of the spherical rolling members rolls along both the flange 76 and the longitudinal guide strip 75, both the axial reaction force F1 acting along the axis of the welding tool and the lateral reaction force F3 can be cancelled out.

Another modification of the welding machine of the present invention may include a guide rail having an inclined surface inclined to a plane perpendicular to the workpiece 34 in the lateral direction Y1 or Y2, and the welding machine may travel with rollers each rotating about an axis inclined at an inclination equal to that of the inclined surface of the guide rail to the vertical direction Z in contact with the inclined surface of the guide rail. Both the axial reaction force F1 acting along the axis of the welding tool and the lateral reaction force F3 can be cancelled out by using those rollers.

Preferred embodiments of the present invention will be described with reference to FIGS. 12 to 16.

The friction stir welding machines and the friction stir welding systems in the foregoing embodiments are provided with the sticking pads 46 made to produce attraction by sucking air by the suction source 47. Sticking pads 96, the welding machine in the third embodiment provided with the sticking pads 96, and a friction stir welding system will be described.

Figure 12:
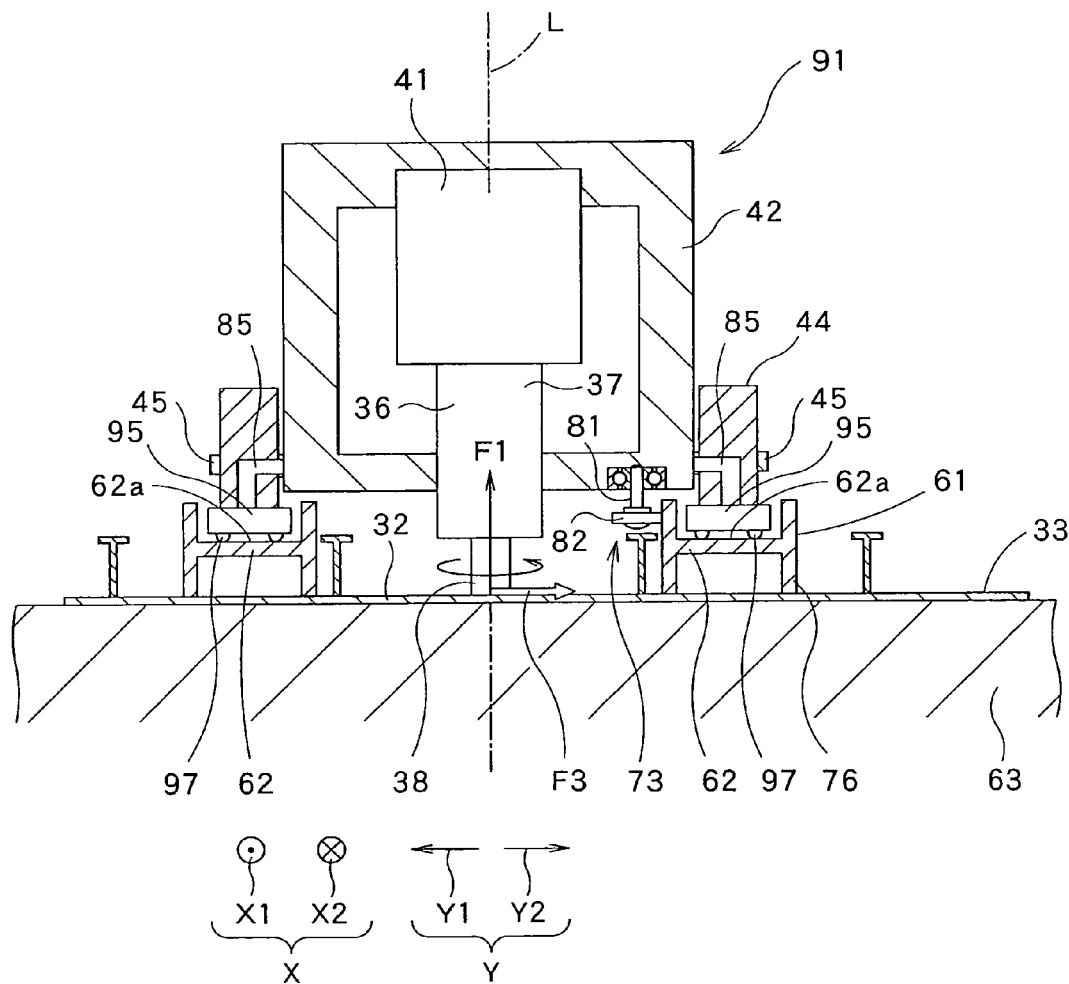
FIG. 12 is a sectional view of a welding machine 91 in a fourth embodiment according to the present invention provided with electromagnetic sticking pads.

FIG. 12 is a sectional view of a welding machine 91 in a fourth embodiment according to the present invention. The welding machine 91 is substantially the same in construction as the welding machine 59 in the second embodiment shown in FIG. 10 except that the welding machine 91 is provided with electromagnetic sticking pads 95, while the welding machine 59 is provided with sticking pads 46 driven by the suction source 47, and hence parts of the welding machine 91 like or corresponding to those of the welding machine 59 are designated by the same reference characters.

Guide rails 61 having a rigidity higher than that of a part to be attracted of a workpiece 34 are extended along a weld line. In the third embodiment, the two guide rails 61 are extended on a surface of the workpiece 34 on one side of the weld line 39 on the side of the first lateral direction Y1 and on the other side of the weld line 39 on the side of the second lateral direction Y2 at equal distances from the weld line 39, respectively. In the third embodiment, the guide rails 61 are steel H-beams capable of being attracted by electromagnets. Each of the guide rails 61 is disposed with its web 62 extending between flanges substantially parallel to the surface of the workpiece 34. The welding machine 91 and the guide rails 61 constitute a friction stir welding system embodying the present invention.

The welding machine 91 is provided with wheels 44 and is disposed such that the wheels 44 roll on guide surfaces 62a, namely, surfaces of the webs 62. The wheels 44 roll on the guide surfaces 62a when the welding machine 91 moves. In FIG. 4, the sticking pad 46 on the front side and the two sticking pads 46 disposed between the two wheels 44 are not arranged on the straight line connecting the two wheels 44 arranged in the traveling direction X. In the third embodiment including the guide rails 61, all the sticking pads 95 are arranged on straight lines each connecting the wheels 44 arranged in the traveling direction. Each sticking pad 95 comes into contact with and sticks to the guide surface 62a. In this embodiment, the guide rails 61 are objects to which the sticking pads 95 stick. Each sticking pad 95 is attached to the lower end of an L-shaped arm 85 attached to a frame included in a vehicle 42.

The guide rails 61 are fixed to, for example, a surface plate 63 on which the workpiece 34 is placed. End parts of the guide rails 61 extend beyond the opposite ends of the workpiece 34 with respect to a traveling direction X. The guide rails 61 are fixed to the surface plate 63 by angles attached to the surface plate 63 with rivets or by welding.

Each sticking pad 95 is driven electromagnetically and is connected through a switching means 99 to a power supply 100 as shown in FIG. 16.

Referring to FIG. 14, the sticking pad 95 includes a frame 95a, and a solenoid 95b placed in the frame 95a. When the solenoid 95b is energized, the sticking pad 95 functions as an electromagnet. The axis of the solenoid 95b is perpendicular to the guide surface 62a. Thus, magnetic lines of force produced by the solenoid 95b intersect the guide surface 62a. The lower surface of the sticking pad 95 is an electromagnetic surface 95c. The sticking pad 95 is attracted to the guide surface 62a by an electromagnetic force.

The switching means connects the power supply 100 to the solenoid 95b to supply current to the solenoid 95b or disconnects the power supply 100 from the solenoid 95b to stop supplying current to the solenoid 95b. The switching means 99 is capable of regulating the current supplied from the power supply 100 to the solenoid 95b to regulate attraction to be applied to the guide rail 61, namely, an object.

As shown in FIG. 14, protrusions 97 are embedded respectively in the four corners of the lower surface of the frame 95a. The tip of each protrusion 97 is formed, for example, in a hemispherical surface to reduce the frictional resistance of the guide surface 62a against the tip of the protrusion 97 in contact with the guide surface 62a. The protrusions 97 come into contact with the guide surface 62a to form a narrow gap between the electromagnetic surface 95c of the sticking pad 95 and the guide surface 62a to keep the electromagnetic surface 95c separated from the guide surface 62a.

As shown in FIG. 15, protrusions 98 may be embedded respectively in the four corners of the lower surface of the frame 95a instead of the protrusions 95. The protrusions 98 have the shape of a quadrangular prism. Slippery films 98a of a material having a low frictional property are attached to the lower end surfaces of the protrusions 98, respectively, so that the sticking pad 95 may be able to slide easily on the guide surface 62a. Suitable materials for forming the slippery films 88a are, for example, Teflon, fluorocarbon resin coating materials, silicone resin coating materials, urethane resin coating materials, acrylic resin coating materials and epoxy resin coating materials.

As mentioned above, the sticking pads 95 are formed in electromagnets, and the guide rails 61 are steel members capable of being attracted by an electromagnet. Guide rails each provided with a solenoid and capable of functioning as an electromagnet when the solenoid is energized and sticking pads capable of being attracted by the guide rails when the solenoids are energized may be used.

The welding machine 91 in the third embodiment further includes a second guide member 73. The second guide member 73 includes a second shaft 81 supported on a part near an end of a lower member on the side of the downward vertical direction Z2 of a vehicle 42 on the side of the second lateral direction Y2 so as to extend in the downward vertical direction Z2, and a cylindrical second roller 82 rotatably supported on the second shaft 81. The second roller 82 is coaxial with the second shaft 81 and rotates about an axis parallel to the vertical direction Z. A welding machine 71 travels in the moving direction X for friction stir welding with the second roller 82 in contact with the flange 76 on the side of the first lateral direction Y1 of the guide rail 61 on the side of the second lateral direction Y2 from the first lateral direction Y1. The flange 76 on the side of the first lateral direction Y1 of the guide rail 61 on the side of the second lateral direction Y2 corresponds to a vertical guide part having a vertical guide surface perpendicular to the surface of the workpiece 34. The surface on the side of the first lateral direction Y1 of this flange 76 corresponds to the vertical guide surface.

The sticking pads 95 of the welding machine 91 in the third embodiment are attracted to the guide rails 61 by electromagnetic force. The rigidity of the guide rails 61 is higher than that of the workpiece 34, and the guide rails 61 are scarcely deformed when the sticking pads 95 are attracted to the guide rails 61. Deformation of the workpiece 34 during friction stir welding can be prevented by attracting the sticking pads 95 to those guide rails 61.

Attraction attracting the sticking pad 95 to the guide rail 61 can be controlled by controlling the electromagnetic force. Attraction working on the moving sticking pads 95 can be stabilized and a fixed attraction can be stably maintained as compared with a case where the attraction is dependent on mechanical frictional force.

Since the sticking pad 95 is electrically controlled by the switching means 99, the sticking pad 95 can be quickly changed between an ON state and an OFF state.

Since the electromagnetic surface 95c can be kept separated from the guide surface 62a, running resistance is low as compared with a state where the sticking pad 95 is in mechanical contact with the guide surface 62a.

Since the attraction is dependent on electromagnetic force, work for changing expendable members of the sticking pad 95 necessary for vacuum suction, such as rubber members and sponge members, is not necessary.

The guide surfaces 62a are finished by a predetermined process such that protrusions 97 or 98 of the sticking pads 95 of the welding machine 91 in the third embodiment can be in contact with the guide surfaces 62a with a low friction coefficient. Thus, resistance working on the welding machine 91 in a direction opposite the direction of travel of the welding machine 91 can be reduced. Since the welding machine 95 travels with the wheels 44 not in contact to with the workpiece 34, the workpiece 34 can be prevented from being damaged during friction stir welding.

The welding machine 91 in the third embodiment travels with the second guide member 73 in contact with the guide rail 61. Thus, the lateral reaction force F3 resulting from the rotation of the welding tool 36 can be cancelled out, the welding machine 91 is restrained from meandering and can achieve intended travel even if friction stir welding is carried out at a high welding speed, and a intended part of the workpiece 34 can be welded by friction stir welding at a high welding speed by the welding tool 36.

Although the third embodiment uses the H-beams as the guide rails 61, members of any shape, such as the shape of a quadrangular prism, can be used as the guide rails 61, provided that the sticking pads 95 can stick to the members and the wheels 44 can roll on the members. The second guide member 73 of the welding machine 91 may be omitted.

Figure 13:
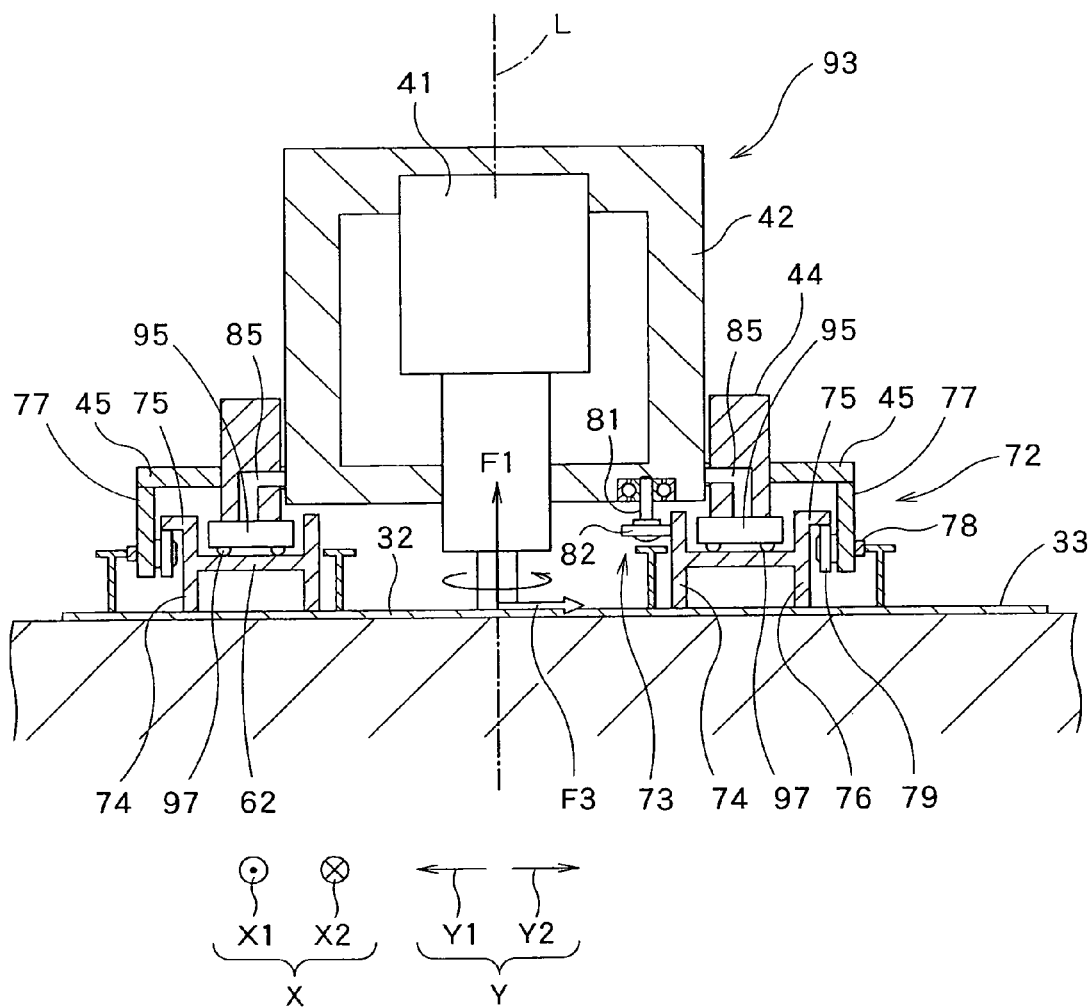
FIG. 13 is a sectional view of a welding machine 93 in a fifth embodiment according to the present invention provided with electromagnetic sticking pads.
Figure 19:
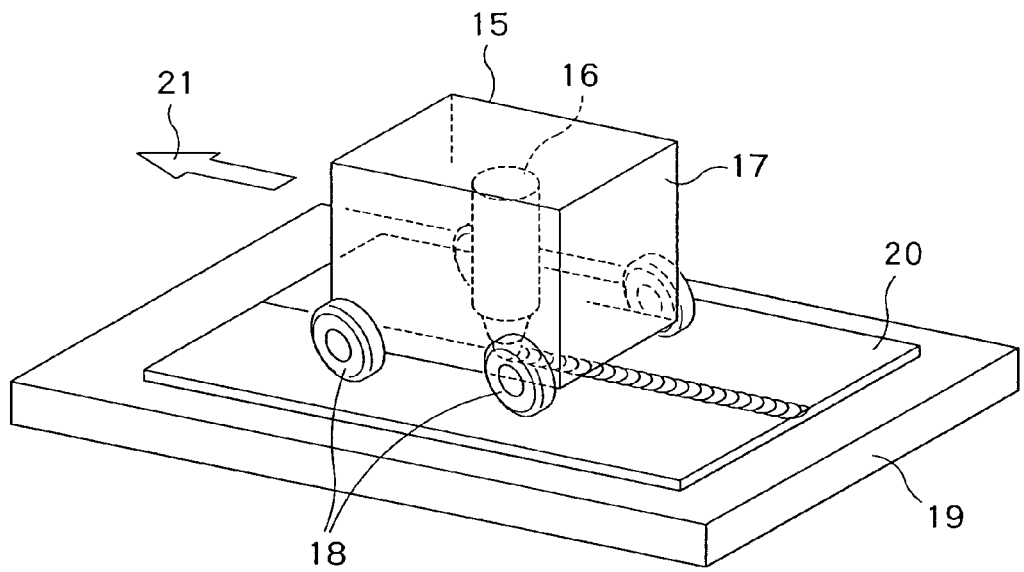
FIG. 19 is a typical perspective view of a conventional small self-propelled friction stir welding machine 15.
Figure 20:
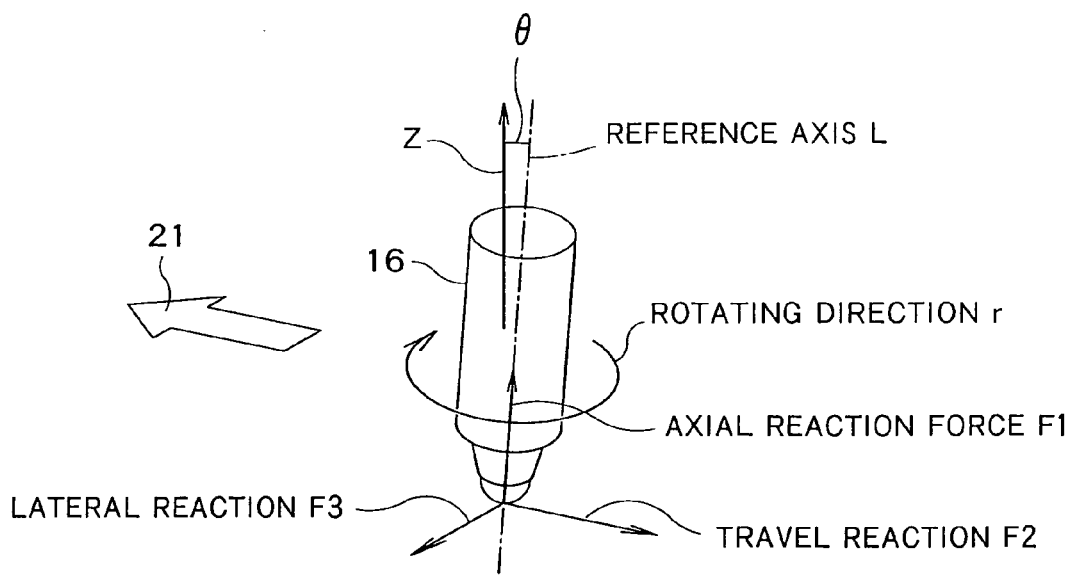
FIG. 20 is a view of assistance in explaining reaction forces that act on a welding tool 16 during friction stir welding.

FIG. 13 is a sectional view of a welding machine 79 in a fifth embodiment according to the present invention. Since the welding machine 93 in the fifth embodiment is substantially the same in construction as the welding machine 93 in the foregoing embodiment, parts of the welding machine 93 like or corresponding to those of the welding machine in the foregoing embodiment are designated by the same reference characters and the description thereof will be omitted to avoid duplication. The welding machine 93 and guide rails 74 constitute a friction stir welding system embodying the present invention.

The guide rails 74 have webs 75 parallel to the surfaces of the workpieces 32 and 33, respectively. The guide rails 74 of the fourth embodiment, similarly to the guide rails 61 of the third embodiment, are steel H-beams. The guide rails 74 of the fourth embodiment have longitudinal guide strips 75 extending in the lateral direction Y from the flanges 76 of the H-beams, respectively. The longitudinal guide strips 75 extend between the opposite ends of the H-beams with respect to the traveling direction X. The longitudinal guide strip 75 of the guide rail 74 on the side of the lateral direction Y1 extends in the lateral direction Y1 from the upper end on the side of the upward vertical direction Z1 of the flange 76 on the side of the lateral direction Y1. The longitudinal guide strip 75 of the guide rail 74 on the side of the lateral direction Y2 extends in the lateral direction Y2 from the upper end on the side of the upward vertical direction Z1 of the flange 76 on the side of the lateral direction Y2.

Axles 45 respectively supporting wheels 44 of this embodiment extend from the wheels 44 in the lateral direction Y beyond the outer ends of the longitudinal guide strips 75, respectively. Each of the first guide members 72 includes a down support arm 77 extending in the downward vertical direction Z2 from the outer end of the axle 45, a first shaft 78 penetrating a lower part on the side of the downward vertical direction Z2 of the down support arm 77 in the lateral direction Y, fixed to the down support arm 77 and extending in the lateral direction Y toward the guide rail 74, and a cylindrical first roller 79 rotatably supported on the first shaft 78. The first roller 79 and the first shaft 78 are coaxial. The first roller 79 rotates about an axis parallel to the lateral direction Y. The welding machine 93 travels in the traveling direction X for friction stir welding with the first rollers 79 in contact with the down support arms 77.

The welding machine 71 in this embodiment travels with the first guide member 72 in contact with the surfaces facing the workpiece 34 of the longitudinal guide strip 75, respectively. Thus, the axial reaction force F1 counteracting the pressure applied to the workpiece 34 by the welding tool 36 can be cancelled out, the wheels 44 can be prevented from separating from the workpiece 34, intended traveling can be achieved, and intended parts can be welded together by friction stir welding with the welding tool 36 at a high welding speed even if friction stir welding is carried out at a high welding speed.

The welding machine 71 in this embodiment travels with the second guide members 73 in contact with the guide rails 74. Thus, the lateral reaction force F3 resulting from the rotation of the welding tool 36 can be cancelled out, the friction stir welding machine can be restrained from meandering, intended travel can be achieved, and intended parts can be welded together by friction stir welding with the welding tool 36 at a high welding speed even if friction stir welding is carried out at a high welding speed.

In a modification of the welding machine of the present invention, spherical rolling members may be brought into contact with L-shaped corners each at the joint of the flange 76 and the longitudinal guide strip 75 instead of the first rollers 79 and the second rollers 82. Since each of the spherical rolling members rolls along both the flange 76 and the longitudinal guide strip 75, both the axial reaction force F1 acting along the axis of the welding tool and the lateral reaction force F3 can be cancelled out.

Another modification of the welding machine of the present invention may include a guide rail having an inclined surface inclined to a plane perpendicular to the workpiece 34 in the lateral direction Y1 or Y2, and the welding machine may travel with rollers each rotating about an axis inclined at an inclination equal to that of the inclined surface of the guide rail to the vertical direction Z in contact with the inclined surface of the guide rail. Both the axial reaction force F1 acting along the axis of the welding tool and the lateral reaction force F3 can be cancelled out by using those rollers.

The invention claimed is:

1. A sticking pad incorporated into a friction stir welding machine including a vehicle and capable of welding plural workpieces together by friction stir welding with a welding tool while traveling along the workpieces, and capable of being brought into contact with an object to keep the welding tool in contact with the workpieces by attraction and of being selectively set in either of an operative state in which the sticking pad is in contact with the object to make attraction effective and an inoperative state in which the sticking pad is separated from the object to make attraction ineffective,
   wherein the sticking pad further includes:
      an elastic, annular sealing member capable of surrounding a suction space and sealing the suction space; and
      a slippery member attached to a surface of the sealing member facing the object, and made of a material that makes the slippery member contact the object with a friction coefficient lower than that with which the sealing member can be in contact with the object.

2. The sticking pad according to claim 1 further comprising protrusions extending toward the object in the suction space, having a rigidity higher than that of the sealing member, and made of a material that can make the protrusions contact the object with a friction coefficient lower than that with which the sealing member is in contact with the object.

3. A friction stir welding machine capable welding plural workpieces together by friction stir welding using, a welding tool, said friction stir welding machine comprising:
   sticking pads set forth in claim 1;
   a tool holding device rotatable about a predetermined reference axis and holding the welding tool;
   a rotational driving means for driving the tool holding device for rotation about the reference axis;
   a linear shifting means for driving the tool holding device for movement along the reference axis; and
   a vehicle loaded with the tool holding device, the rotational driving means, and the linear shifting means and capable of traveling.

4. The friction stir welding machine according to claim 3, wherein the plural sticking pads include main sticking pads capable of producing a high attraction and disposed on a front part of the vehicle, and at least one auxiliary sticking pad disposed on the rear side of the main sticking pads and capable of producing a low attraction, and the number and positions of at least one auxiliary sticking pad are adjustable.

5. The friction stir welding machine according to claim 3 further comprising switching means for selectively setting the sticking pads in either of the operative state and the inoperative state.

6. A friction stir welding system comprising:
   the friction stir welding machine set forth in claim 3; and
   guide rails extended along a weld line and having a high rigidity higher than that of workpieces;
   wherein the sticking pads are attracted to the guide rails.

7. The friction stir welding system according to claim 6, wherein the guide rails have surfaces on which wheels included in the friction stir welding machine roll and to which the sticking pads stick, and the surfaces of the guide rails are finished by a predetermined process such that the sticking pads are in contact with the surfaces of the guide rails with a low friction coefficient.

8. A friction stir welding system comprising:
   a friction stir welding machine capable welding plural workpieces together by friction stir welding using a welding tool, said friction stir welding machine including:
      a sticking pad incorporated into the friction stir welding machine including a vehicle and capable of welding plural workpieces together by friction stir welding with the welding tool while traveling along the workpieces, and capable of being brought into contact with an object to keep the welding tool in contact with the workpieces by attraction and of being selectively set in either of an operative state in which the sticking pad is in contact with the object to make attraction effective and an inoperative state in which the sticking pad is separated from the object to make attraction ineffective;
      a tool holding device rotatable about a predetermined reference axis and holding the welding tool;
      a rotational driving means for driving the tool holding device for rotation about the reference axis; and
      a linear shifting means for driving the tool holding device for movement along the reference axis, wherein the vehicle is loaded with the tool holding device, the rotational driving means, and the linear shifting means and is capable of traveling; and
   guide rails extended on surfaces of the workpieces along a weld line corresponding to a joint of the workpieces, the guide rails having a high rigidity higher than that of the workpieces and parallel parts extending parallel to the surfaces of the workpieces, wherein the sticking pads are attracted to the guide rails, and wherein the friction stir welding machine further includes guide members, the friction stir welding machine being capable of welding the workpieces together by friction stir welding with the welding tool while the vehicle is traveling with the guide members kept in contact with surfaces of the parallel parts of the guide rails facing the workpieces.

9. The friction stir welding system according to claim 6, wherein each of the guide rails has a vertical part having a guide surface perpendicular to the surfaces of the workpieces, and the friction stir welding machine further includes second guide members in contact with the guide surfaces.

10. The sticking pad according to claim 1, wherein the sticking pad can electromagnetically stick to the object, and the sticking pad is provided with an electromagnet capable of attracting the object when a current is supplied thereto.

11. The sticking pad according to claim 10, wherein the sticking pad is provided with plural protrusions for spacing the electromagnets from the object.

12. The sticking pad according to claim 11, wherein each of the protrusions has a spherical tip.

13. The sticking pad according to claim 11, wherein a slippery film is formed on the tip of each protrusion to make the protrusion slide easily relative to the object.

14. A friction stir welding machine capable welding plural workpieces together by friction stir welding using a welding tool, said friction stir welding machine comprising:

sticking pads set forth in claim 10;

a tool holding device rotatable about a predetermined reference axis and holding the welding tool;

a rotational driving means for driving the tool holding device for rotation about the reference axis;

a linear shifting means for driving the tool holding device for movement along the reference axis; and a vehicle loaded with the tool holding device, the rotational driving means, and the linear shifting means and capable of traveling.

15. The friction stir welding machine according to claim 14 further comprising switching means for selectively setting the sticking pads in either of an operative state and an inoperative state.

16. A friction stir welding system comprising:

the friction stir welding machine according to claim 14;

guide rails extended along a weld line and having a rigidity higher than that of parts to be attracted of workpieces;

wherein the guide rails are an object to which the sticking pads stick.

17. The friction stir welding system according to claim 16, wherein the guide rails have surfaces on which wheels included in the friction stir welding machine roll.

18. The friction stir welding system according to claim 16, wherein each of the guide rails has a vertical part having a guide surface perpendicular to the surfaces of the workpieces, and the friction stir welding machine further includes second guide members in contact with the guide surfaces.

* * * * *